United States Patent
Wang et al.

(10) Patent No.: US 12,088,209 B2
(45) Date of Patent: Sep. 10, 2024

(54) ASYMMETRICAL HALF-BRIDGE FLYBACK CONVERTER AND POWER SUPPLY SYSTEM

(71) Applicant: Huawei Digital Power Technologies Co., Ltd., Shenzhen (CN)

(72) Inventors: Lei Wang, Shenzhen (CN); Liang Wu, Dongguan (CN); Zuwei He, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 282 days.

(21) Appl. No.: 17/690,840

(22) Filed: Mar. 9, 2022

(65) Prior Publication Data

US 2022/0294358 A1    Sep. 15, 2022

(30) Foreign Application Priority Data

Mar. 9, 2021    (CN) .......................... 202110255669.5

(51) Int. Cl.
*H02M 3/335*    (2006.01)
*H02M 1/14*    (2006.01)

(52) U.S. Cl.
CPC ......... *H02M 3/33592* (2013.01); *H02M 1/14* (2013.01)

(58) Field of Classification Search
CPC ............. H02M 3/335; H02M 3/33538; H02M 3/33592; H02M 1/14
See application file for complete search history.

(56) References Cited

U.S. PATENT DOCUMENTS

| 4,785,387 | A  | 11/1988 | Lee et al. |
| 9,954,456 | B2 | 4/2018  | Xue et al. |

(Continued)

FOREIGN PATENT DOCUMENTS

| CN | 1602579 A   | 3/2005 |
| CN | 105375783 A | 3/2016 |

(Continued)

OTHER PUBLICATIONS

Li Mingxiao et al., "Analysis and Optimal Design of High-Frequency and High-Efficiency Asymmetrical Half-Bridge Flyback Converters," IEEE Transactions on Industrial Electronics, vol. 67, No. 10, IEEE Service Center, Piscataway, NJ, USA, total 10 pages (Nov. 6, 2019).

*Primary Examiner* — Adolf D Berhane
(74) *Attorney, Agent, or Firm* — Leydig, Voit & Mayer, Ltd.

(57) ABSTRACT

Embodiments of this application disclose an asymmetrical half-bridge flyback converter and a power supply system, to reduce a loss of the asymmetrical half-bridge flyback converter, and improve efficiency of the asymmetrical half-bridge flyback converter. The asymmetrical half-bridge flyback converter, including: a first power transistor, a second power transistor, a primary-side resonant capacitor, a transformer, a third power transistor, and a secondary-side resonant capacitor, where the first power transistor and the second power transistor are coupled to two terminals of a direct current power supply after being connected in series; and a primary side of the transformer is connected in parallel to two terminals of the first power transistor through the primary-side resonant capacitor, and a secondary side of the transformer is coupled to the third power transistor and the secondary-side resonant capacitor.

15 Claims, 8 Drawing Sheets

(56) References Cited

U.S. PATENT DOCUMENTS

| | | | | |
|---|---|---|---|---|
| 10,170,974 B1* | 1/2019 | Oh | ............................ | H02M 1/32 |
| 10,218,256 B2* | 2/2019 | Oh | ........................ | H02M 1/4241 |
| 11,682,977 B2* | 6/2023 | Wang | ........................ | H02M 1/08 |
| | | | | 363/17 |
| 11,843,318 B2* | 12/2023 | Yang | ......................... | H02M 1/38 |
| 2012/0063175 A1* | 3/2012 | Wang | ................. | H02M 3/33592 |
| | | | | 363/21.14 |
| 2015/0124492 A1* | 5/2015 | Fu | ..................... | H02M 3/33546 |
| | | | | 363/21.02 |
| 2016/0181927 A1* | 6/2016 | Chang | ..................... | H02M 1/42 |
| | | | | 363/21.02 |
| 2018/0248489 A1* | 8/2018 | Wang | ...................... | H02M 7/217 |
| 2022/0158536 A1* | 5/2022 | Jaksa | ......................... | H02M 3/01 |

FOREIGN PATENT DOCUMENTS

| | | | |
|---|---|---|---|
| CN | 107769569 A | 3/2018 | |
| CN | 111262444 A | 6/2020 | |
| EP | 1855381 A1 | 11/2007 | |
| EP | 3160028 A1 | 4/2017 | |

\* cited by examiner

ASYMMETRICAL HALF-BRIDGE FLYBACK CONVERTER AND POWER SUPPLY SYSTEM

CROSS-REFERENCE TO RELATED APPLICATION

This application claims priority to Chinese Patent Application No. 202110255669.5, filed on Mar. 9, 2021, which is hereby incorporated by reference in its entirety.

TECHNICAL FIELD

This application relates to the field of power technologies, and in particular, to an asymmetrical half-bridge flyback converter and a power supply system.

BACKGROUND

Currently, a switching power supply has advantages such as high efficiency and a small size, and is widely used in various power supply systems. An asymmetrical half-bridge (AHB) converter is atypical switching power supply. To meet a requirement of fully conserving energy, efficiency of a full-load or heavy-load operation mode of the asymmetrical half-bridge converter becomes a key characteristic. In particular, for half-wave rectification, a ripple of an output current is large. Therefore, a loss of the asymmetrical half-bridge converter is increased, and efficiency of the asymmetrical half-bridge converter is reduced.

SUMMARY

Embodiments of this application provide an asymmetrical half-bridge flyback converter and a power supply system, to reduce a loss of the asymmetrical half-bridge flyback converter, and improve efficiency of the asymmetrical half-bridge flyback converter.

To resolve the foregoing technical problem, the embodiments of this application provide the following technical solutions.

According to a first aspect, an embodiment of this application provides an asymmetrical half-bridge flyback converter. The asymmetrical half-bridge flyback converter includes: a first power transistor, a second power transistor, a primary-side resonant capacitor, a transformer, a third power transistor, and a secondary-side resonant capacitor, where the first power transistor and the second power transistor are coupled to two terminals of a direct current power supply after being connected in series; and a primary side of the transformer is connected in parallel to two terminals of the first power transistor through the primary-side resonant capacitor, and a secondary side of the transformer is coupled to the third power transistor and the secondary-side resonant capacitor.

In this embodiment of this application, the asymmetrical half-bridge flyback converter includes: the first power transistor, the second power transistor, the primary-side resonant capacitor, the transformer, the third power transistor, and the secondary-side resonant capacitor, where the first power transistor and the second power transistor are coupled to the two terminals of the direct current power supply after being connected in series; and the primary side of the transformer is connected in parallel to the two terminals of the first power transistor through the primary-side resonant capacitor, and the secondary side of the transformer is coupled to the third power transistor and the secondary-side resonant capacitor. Because the primary side of the transformer is coupled to the primary-side resonant capacitor, and the secondary side of the transformer is coupled to the secondary-side resonant capacitor, a waveform of a current flowing through the third power transistor can be adjusted through cooperation of the primary-side resonant capacitor and the secondary-side resonant capacitor, so that a root mean square value of the current flowing through the third power transistor is reduced, thereby reducing a turn-on loss of the third power transistor, reducing a loss of the asymmetrical half-bridge flyback converter, and improving efficiency of the asymmetrical half-bridge flyback converter.

In an embodiment of the first aspect, the transformer includes an excitation inductor and a transformer leakage inductor; and when the first power transistor is turned on, the primary-side resonant capacitor, the secondary-side resonant capacitor, and the transformer leakage inductor all participate in resonance, and the resonance is hybrid resonance. In the solution, turn-on of the first power transistor can be controlled. In this case, in the asymmetrical half-bridge flyback converter, the primary-side resonant capacitor, the secondary-side resonant capacitor, and the transformer leakage inductor participate in the resonance, and the resonance is hybrid resonance. Because the secondary-side resonant capacitor is used in a circuit of the asymmetrical half-bridge flyback converter to implement the hybrid resonance, an original resonance current waveform is effectively improved, the root mean square value of the current flowing through the third power transistor $Q_1$ is reduced, the turn-on loss of the third power transistor is reduced, and the efficiency of the asymmetrical half-bridge flyback converter is improved.

In an embodiment of the first aspect, the transformer includes an excitation inductor and a transformer leakage inductor; and when the first power transistor is turned on, the secondary-side resonant capacitor and the transformer leakage inductor participate in resonance, the primary-side capacitor of the transformer does not participate in the resonance, the resonance is secondary-side resonance, and the primary-side capacitor is a capacitor coupled to the primary side of the transformer. In the solution, turn-on of the first power transistor can be controlled. In this case, in a circuit of the asymmetrical half-bridge flyback converter, the secondary-side resonant capacitor and the transformer leakage inductor participate in the resonance, the primary-side capacitor of the transformer does not participate in the resonance, the resonance is secondary-side resonance, and the primary-side capacitor is a capacitor coupled to the primary side of the transformer. Although the primary-side capacitor is in a resonant circuit, the primary-side capacitor can be considered as a constant voltage source. Because the secondary-side resonant capacitor is used in the circuit of the asymmetrical half-bridge flyback converter to implement the secondary-side resonance, a resonance current waveform is effectively improved, a root mean square value of a current of the secondary-side resonance is reduced, the turn-on loss of the third power transistor is reduced, and the efficiency of the asymmetrical half-bridge flyback converter is improved.

In an embodiment of the first aspect, the asymmetrical half-bridge flyback converter further includes a filter, where the filter is connected in parallel to the secondary-side resonant capacitor; and the filter is configured to reduce ripples of an output voltage of the asymmetrical half-bridge flyback converter. In the solution, a specific implementation form of the filter further included in the asymmetrical half-bridge flyback converter is not limited. The filter is connected in parallel to the secondary-side resonant capacitor, and the filter is configured to reduce the ripples of the output voltage of the asymmetrical half-bridge flyback converter, so that the output voltage is more stable. In addition, the filter is further configured to reduce electromagnetic interference and improve electromagnetic compatibility.

In an embodiment of the first aspect, the filter includes a first inductor and a first capacitor. The first inductor is configured to reduce ripples of the first capacitor; and the secondary-side resonant capacitor is further configured to reduce the ripples of the first capacitor, to reduce a loss caused by an equivalent series resistance ESR of the first capacitor. In the solution, the first inductor and the first capacitor are connected in series, and the first inductor is configured to reduce the ripples of the first capacitor. The secondary-side resonant capacitor is connected in parallel to the first capacitor through the first inductor. Therefore, the secondary-side resonant capacitor is further configured to reduce the ripples of the first capacitor, and reduce the loss caused by the ESR of the first capacitor. The first capacitor may be specifically an electrolytic capacitor.

In an embodiment of the first aspect, the filter includes a single-stage LC filter and a multi-stage LC filter. In the solution, the filter includes the single-stage LC filter, for example, the single-stage LC filter includes the first inductor and the first capacitor. For another example, the filter includes the multi-stage LC filter, and the multi-stage LC filter may be considered as being obtained by connecting a plurality of single-stage LC filters in series. By using the plurality of filters, the ripples of the output voltage of the asymmetrical half-bridge flyback converter are reduced, so that the output voltage is more stable.

In an embodiment of the first aspect, a parameter of the hybrid resonance is adjusted, to reduce a root mean square value of a current flowing through the third power transistor. In the solution, in a scenario in which the hybrid resonance is formed in the circuit of the asymmetrical half-bridge flyback converter, to further reduce the root mean square value of the current flowing through the third power transistor, the parameter of the hybrid resonance can be adjusted, to reduce the root mean square value of the current flowing through the third power transistor, thereby reducing the turn-on loss of the third power transistor. The parameter of the hybrid resonance is a parameter of a circuit that forms the hybrid resonance, for example, a parameter of a resonant element (the transformer leakage inductor, a resonant capacitor, or the like) in the circuit that forms the hybrid resonance is adjusted. The parameter of the hybrid resonance may also be referred to as a resonant circuit parameter. A process of specifically adjusting the parameter of the hybrid resonance is not limited in this embodiment of this application. For example, how to adjust the parameter of the hybrid resonance may be determined based on a specific circuit, in the asymmetrical half-bridge flyback converter, that forms the hybrid resonance.

In an embodiment of the first aspect, the adjustment of the parameter of the hybrid resonance includes at least one of the following: adjusting the primary-side resonant capacitor, adjusting the secondary-side resonant capacitor, and adjusting a ratio of a capacitance value of the primary-side resonant capacitor to an equivalent capacitance value of the secondary-side resonant capacitor on the primary side. The ratio of the capacitance value of the primary-side resonant capacitor to the equivalent capacitance value of the secondary-side resonant capacitor on the primary side is represented as $$\frac{C_{rp}N_p^2}{C_{rs}N_s^2},$$

where $C_{rp}$ represents the capacitance value of the primary-side resonant capacitor, $$\frac{C_{rs}N_s^2}{N_p^2}$$

represents the equivalent capacitance value of the secondary-side resonant capacitor on the primary side, $C_{rs}$ represents a capacitance value of the secondary-side resonant capacitor, $N_p$ represents a quantity of turns of a primary-side winding of the transformer, and $N_s$ represents a quantity of turns of a secondary-side winding of the transformer.

In the solution, the equivalent capacitance value of the secondary-side resonant capacitor on the primary side is a corresponding capacitance value when the capacitance value of the secondary-side resonant capacitor is equivalent to the primary side. Parameters of the hybrid resonance may include: the capacitance value of the primary-side resonant capacitor, the capacitance value of the secondary-side resonant capacitor, and a value of the ratio of the capacitance value of the primary-side resonant capacitor to the equivalent capacitance value of the secondary-side resonant capacitor on the primary side. The ratio of the capacitance value of the primary-side resonant capacitor to the equivalent capacitance value of the secondary-side resonant capacitor on the primary side is represented as $$\frac{C_{rp}N_p^2}{C_{rs}N_s^2}.$$

Therefore, an expression of the ratio is adjusted, to reduce the root mean square value of the current flowing through the third power transistor. For example, $Cr_p$ or $C_{rs}$ may be adjusted, or a ratio of the quantity of the turns of the primary-side winding to the quantity of the turns of the secondary-side winding of the transformer is adjusted. A detailed adjustment amount is not limited in this embodiment of this application, and needs to be determined with reference to a specific application scenario. In this embodiment of this application, a ratio of the hybrid resonance is adjusted to improve the waveform of the current of the third power transistor, so that a root mean square value of a current of the secondary-side winding is as small as possible, thereby reducing the turn-on loss of the third power transistor.

In an embodiment of the first aspect, the adjustment of the parameter of the hybrid resonance includes: adjusting initial state values of the hybrid resonance. The asymmetrical half-bridge flyback converter further includes a second capacitor, and the second capacitor is connected in parallel to the third power transistor; and the second capacitor is configured to adjust the initial state values of the hybrid resonance. In the solution, the initial state values of the hybrid resonance refer to state values of resonant elements, in an initial state, of a hybrid resonant circuit when the primary-side resonant capacitor, the secondary-side resonant capacitor, and the transformer leakage inductor participate in the resonance to form the hybrid resonant circuit, and the resonant elements include the primary-side resonant capacitor, the secondary-side resonant capacitor, and the transformer leakage inductor. For example, the initial state values of the hybrid resonance include an initial current value of the transformer leakage inductor (namely, a resonant inductor) and an initial voltage value of a resonant capacitor (namely, a capacitor that participates in the resonance). Therefore, the initial state values of the hybrid resonance are adjusted to reduce the root mean square value of the current of the third power transistor. A detailed adjustment amount is not limited in this embodiment of this application, and needs to be determined with reference to a specific application scenario. In this embodiment of this application, the initial state values of the hybrid resonance are adjusted to improve the waveform of the current of the third power transistor, so that a root mean square value of a current of the secondary-side winding is as small as possible, thereby reducing the turn-on loss of the third power transistor.

In an embodiment of the first aspect, the asymmetrical half-bridge flyback converter further includes a first resistor; the first resistor and the second capacitor are connected in series; and the first resistor is configured to reduce a current surge on the third power transistor and reduce current oscillation when the third power transistor is turned on. In the solution, after the second capacitor and the first resistor are connected in series, the second capacitor and the first resistor are connected in parallel to the third power transistor. When the third power transistor is turned on, the current surge on the third power transistor and the current oscillation can be reduced by using a damping effect of the first resistor on a current. For example, the first resistor and the second capacitor form a snubber circuit. The snubber circuit is connected in parallel to the third power transistor, and the electromagnetic compatibility is improved by adding the snubber circuit.

In an embodiment of the first aspect, a parameter of the secondary-side resonance is adjusted, to reduce a root mean square value of a current flowing through the third power transistor. In the solution, in a scenario in which the secondary-side resonance is formed in the circuit of the asymmetrical half-bridge flyback converter, to further reduce the root mean square value of the current flowing through the third power transistor, the parameter of the secondary-side resonance can be adjusted, to reduce the root mean square value of the current flowing through the third power transistor, thereby reducing the turn-on loss of the third power transistor. The parameter of the secondary-side resonance is a parameter of a circuit that forms the secondary-side resonance, for example, a parameter of a resonant element (the transformer leakage inductor, the secondary-side resonant capacitor, or the like) in the circuit that forms the secondary-side resonance is adjusted. The parameter of the secondary-side resonance may also be referred to as a secondary-side resonant circuit parameter. A process of specifically adjusting the parameter of the secondary-side resonance is not limited in this embodiment of this application. For example, how to adjust the parameter of the secondary-side resonance may be determined based on a specific circuit, in the asymmetrical half-bridge flyback converter, that forms the secondary-side resonance.

In an embodiment of the first aspect, the adjustment of the parameter of the secondary-side resonance includes: adjusting the secondary-side resonant capacitor. In the solution, a capacitance value of the secondary-side resonant capacitor can be adjusted. A detailed adjustment amount is not limited in this embodiment of this application, and needs to be determined with reference to a specific application scenario. In this embodiment of this application, the secondary-side resonant capacitor is adjusted to improve the waveform of the current of the third power transistor, so that a root mean square value of a current of the secondary-side winding is as small as possible, thereby reducing the turn-on loss of the third power transistor.

In an embodiment of the first aspect, the adjustment of the parameter of the secondary-side resonance includes: adjusting resonant element initial state values of the secondary-side resonance. The asymmetrical half-bridge flyback converter further includes a second capacitor, and the second capacitor is connected in parallel to the third power transistor; and the second capacitor is configured to adjust the initial state values of the secondary-side resonance. In the solution, the initial state values of the secondary-side resonance refer to state values of resonant elements, in an initial state, of a secondary-side resonant circuit when the secondary-side resonant capacitor and the transformer leakage inductor participate in the resonance to form the secondary-side resonant circuit, and the resonant elements include the secondary-side resonant capacitor and the transformer leakage inductor. For example, the initial state values of the secondary-side resonance include an initial current value of the transformer leakage inductor (namely, a resonant inductor) and an initial voltage value of a resonant capacitor (namely, a capacitor that participates in the resonance). Therefore, the initial state values of the secondary-side resonance are adjusted to reduce the root mean square value of the current of the third power transistor. A detailed adjustment amount is not limited in this embodiment of this application, and needs to be determined with reference to a specific application scenario. In this embodiment of this application, the initial state values of the secondary-side resonance are adjusted to improve the waveform of the current of the third power transistor, so that a root mean square value of a current of the secondary-side winding is as small as possible, thereby reducing the turn-on loss of the third power transistor.

In an embodiment of the first aspect, the first power transistor is an upper transistor, and the second power transistor is a lower transistor; or the first power transistor is a lower transistor, and the second power transistor is an upper transistor. In the solution, the first power transistor is the upper transistor, and the second power transistor is the lower transistor. That is, the primary side of the transformer is connected in parallel to two terminals of the upper transistor. In this case, the asymmetrical half-bridge flyback converter is an asymmetrical half-bridge flyback converter in which the transformer is connected to an upper half-bridge arm. Alternatively, the first power transistor is the lower transistor, and the second power transistor is the upper transistor. That is, the primary side of the transformer is connected in parallel to two terminals of the lower power transistor. In this case, the asymmetrical half-bridge flyback converter is an asymmetrical half-bridge flyback converter in which the transformer is connected to a lower half-bridge arm.

In an embodiment of the first aspect, the third power transistor includes at least one of the following: a synchronous rectifier and a diode. In the solution, for example, the third power transistor is the synchronous rectifier, and the synchronous rectifier plays a role of rectification. When an output voltage of the secondary side of the transformer remains unchanged, in this embodiment of this application, the synchronous rectifier and the secondary-side resonant capacitor are connected in series, and control parameters and circuit parameters of the asymmetrical half-bridge flyback converter can be adjusted through cooperation of the primary-side resonant capacitor and the secondary-side resonant capacitor in the asymmetrical half-bridge flyback converter, so that the root mean square value of the current flowing through the third power transistor can be reduced, thereby reducing a turn-on loss of the synchronous rectifier. In addition, the synchronous rectifier may be replaced by the diode to implement a rectification function, and the control parameters and the circuit parameters of the asymmetrical half-bridge flyback converter can be adjusted through cooperation of the primary-side resonant capacitor and the secondary-side resonant capacitor in the asymmetrical half-bridge flyback converter, so that a root mean square value of a current flowing through the diode can be reduced, thereby reducing a turn-on loss of the diode.

According to a second aspect, an embodiment of this application further provides a power supply system, including: a direct current power supply and the asymmetrical half-bridge flyback converter described in any implementation of the first aspect, where an input terminal of the asymmetrical half-bridge flyback converter is coupled to the direct current power supply.

In the second aspect of this application, a component part of the power supply system may be the structure described in the first aspect and the various possible implementations. For details, refer to the descriptions in the first aspect and the various possible implementations.

According to a third aspect, an embodiment of this application provides an asymmetrical half-bridge converter. The asymmetrical half-bridge converter includes the asymmetrical half-bridge flyback converter described in any implementation of the first aspect. Alternatively, the asymmetrical half-bridge converter includes an asymmetrical half-bridge forward converter. A connection manner of dotted terminals of a transformer in the asymmetrical half-bridge forward converter is contrary to a connection manner of dotted terminals of the transformer in the asymmetrical half-bridge flyback converter. The asymmetrical half-bridge forward converter includes a first transistor, a second transistor, a primary-side resonant capacitor, a transformer, a third power transistor, and a secondary-side resonant capacitor. The first power transistor and the second power transistor are coupled to two terminals of a direct current power supply after being connected in series. A primary side of the transformer is connected in parallel to two terminals of the first power transistor through the primary-side resonant capacitor, and a secondary side of the transformer is coupled to the third power transistor and the secondary-side resonant capacitor.

In this embodiment of this application, the asymmetrical half-bridge flyback converter includes: the first power transistor, the second power transistor, the primary-side resonant capacitor, the transformer, the third power transistor, and the secondary-side resonant capacitor, where the first power transistor and the second power transistor are coupled to the two terminals of the direct current power supply after being connected in series; and the primary side of the transformer is connected in parallel to the two terminals of the first power transistor through the primary-side resonant capacitor, and the secondary side of the transformer is coupled to the third power transistor and the secondary-side resonant capacitor. Because the primary side of the transformer is coupled to the primary-side resonant capacitor, and the secondary side of the transformer is coupled to the secondary-side resonant capacitor, a waveform of a current flowing through the third power transistor can be adjusted through cooperation of the primary-side resonant capacitor and the secondary-side resonant capacitor, so that a root mean square value of the current flowing through the third power transistor is reduced, thereby reducing a turn-on loss of the third power transistor, reducing a loss of the asymmetrical half-bridge flyback converter, and improving efficiency of the asymmetrical half-bridge flyback converter.

In this embodiment of this application, the asymmetrical half-bridge forward converter includes: the first power transistor, the second power transistor, the primary-side resonant capacitor, the transformer, the third power transistor, and the secondary-side resonant capacitor, where the first power transistor and the second power transistor are coupled to the two terminals of the direct current power supply after being connected in series; and the primary side of the transformer is connected in parallel to the two terminals of the first power transistor through the primary-side resonant capacitor, and the secondary side of the transformer is coupled to the third power transistor and the secondary-side resonant capacitor. Because the primary side of the transformer is coupled to the primary-side resonant capacitor, and the secondary side of the transformer is coupled to the secondary-side resonant capacitor, a waveform of a current flowing through the third power transistor can be adjusted through cooperation of the primary-side resonant capacitor and the secondary-side resonant capacitor, so that a root mean square value of the current flowing through the third power transistor is reduced, thereby reducing a turn-on loss of the third power transistor, reducing a loss of the asymmetrical half-bridge forward converter, and improving efficiency of the asymmetrical half-bridge forward converter.

According to a fourth aspect, an embodiment of this application further provides a power supply system, including: a direct current power supply and the asymmetrical half-bridge converter described in the third aspect.

An input terminal of the asymmetrical half-bridge converter is coupled to the direct current power supply.

In the fourth aspect of this application, a component part of the power supply system may be the structure described in the third aspect and the various possible implementations. For details, refer to the descriptions in the third aspect and the various possible implementations.

DESCRIPTION OF EMBODIMENTS

The following further describes the embodiments of this application in detail with reference to the accompanying drawings.

An embodiment of this application provides an asymmetrical half-bridge (AHB) flyback converter. The asymmetrical half-bridge flyback converter may also be referred to as an asymmetrical half-bridge flyback converter. The asymmetrical half-bridge flyback converter combines advantages of an asymmetrical half-bridge converter and a flyback converter, and has features such as a simple structure, low costs, and high efficiency. The asymmetrical half-bridge flyback converter may be used in a power supply system. For example, the power supply system may specifically include a power adapter, a lithium battery charger, a communications power supply, a server power supply, and the like.

An embodiment of this application further provides a direct-current/direct-current converter (DC/DC). The DC/DC converter in this embodiment of this application may include but is not limited to an asymmetrical half-bridge flyback converter, an asymmetrical half-bridge forward converter, an LLC resonant converter, or the like.

An embodiment of this application provides an asymmetrical half-bridge converter. The asymmetrical half-bridge converter includes: an asymmetrical half-bridge flyback converter.

Alternatively, the asymmetrical half-bridge converter includes an asymmetrical half-bridge forward converter.

A connection manner of dotted terminals of a transformer in the asymmetrical half-bridge forward converter is contrary to a connection manner of dotted terminals of a transformer in the asymmetrical half-bridge flyback converter.

Figure 1:
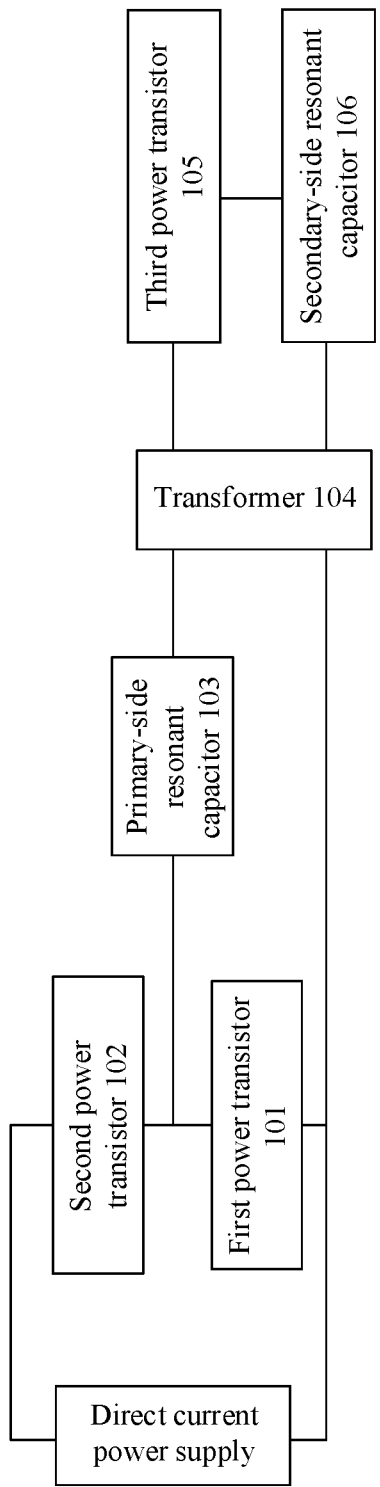
FIG. 1 is a schematic diagram of a component structure of an asymmetrical half-bridge converter according to an embodiment of this application.

For example, as shown in FIG. 1, the asymmetrical half-bridge converter includes an asymmetrical half-bridge forward converter. The asymmetrical half-bridge forward converter includes: a first power transistor 101, a second power transistor 102, a primary-side resonant capacitor 103, a transformer 104, a third power transistor 105, and a secondary-side resonant capacitor 106.

The first power transistor 101 and the second power transistor 102 are coupled to two terminals of a direct current power supply after being connected in series.

A primary side of the transformer 104 is connected in parallel to two terminals of the first power transistor 101 through the primary-side resonant capacitor 103, and a secondary side of the transformer 104 is coupled to the third power transistor 105 and the secondary-side resonant capacitor 106.

An embodiment of this application further provides an asymmetrical half-bridge converter. The asymmetrical half-bridge converter in this embodiment of this application may include but is not limited to an asymmetrical half-bridge flyback converter or an asymmetrical half-bridge forward converter.

Figure 2:
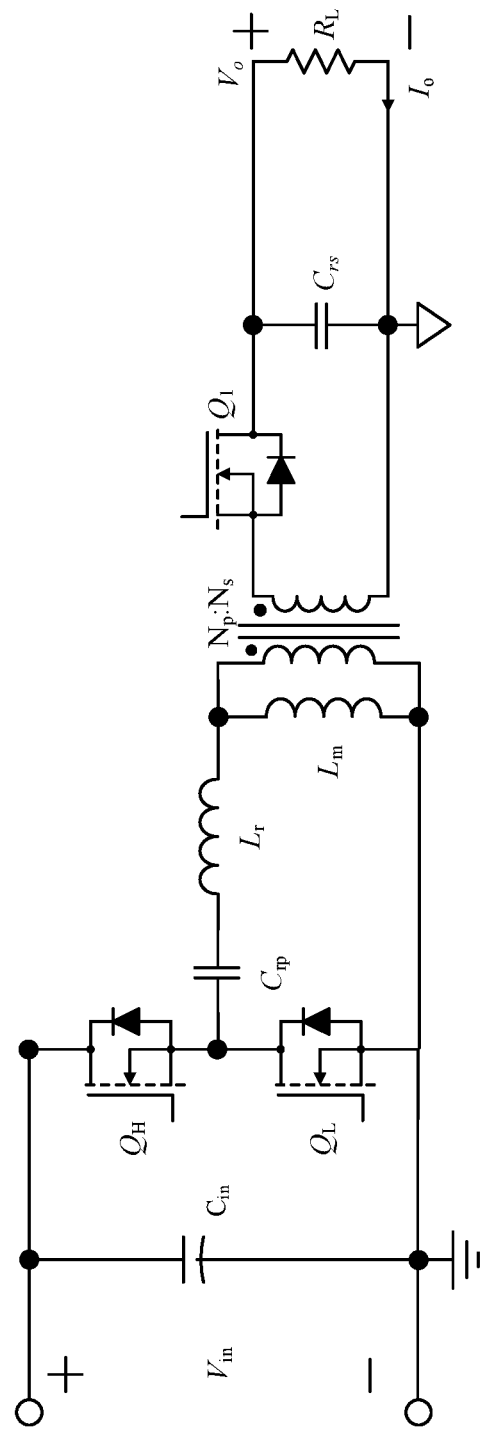
FIG. 2 is a circuit diagram of an asymmetrical half-bridge forward converter according to an embodiment of this application.

FIG. 2 is a circuit diagram of an asymmetrical half-bridge forward converter. The asymmetrical half-bridge forward converter includes: a first power transistor $Q_L$, a second power transistor $Q_H$, a primary-side resonant capacitor $C_{rp}$, a transformer leakage inductor $L_r$, an excitation inductor $L_m$, a third power transistor $Q_1$, and a secondary-side resonant capacitor $C_{rs}$.

The first power transistor $Q_L$ and the second power transistor $Q_H$ are coupled to two terminals of a direct current power supply $V_{in}$ after being connected in series.

A primary side of the transformer is connected in parallel to two terminals of the first power transistor $Q_L$ through the primary-side resonant capacitor $C_{rp}$, and a secondary side of the transformer is coupled to the third power transistor $Q_1$ and the secondary-side resonant capacitor $C_{rs}$. For example, in FIG. 2, an example in which the third power transistor $Q_1$ is a synchronous rectifier SR is used for description.

For example, the asymmetrical half-bridge forward converter includes the transformer. One side of the primary side of the transformer, for example, an upper side, and the other side of the secondary side of the transformer, for example, an upper side, are dotted terminals, or the other side of the primary side of the transformer, for example, a lower side, and one side of the secondary side of the transformer, for example, a lower side, are dotted terminals.

In the subsequent embodiments, description is performed based on that the asymmetrical half-bridge converter is specifically an asymmetrical half-bridge flyback converter. As shown in FIG. 1, an embodiment of this application provides an asymmetrical half-bridge flyback converter, including a first power transistor 101, a second power transistor 102, a primary-side resonant capacitor 103, a transformer 104, a third power transistor 105, and a secondary-side resonant capacitor 106.

The first power transistor 101 and the second power transistor 102 are coupled to two terminals of a direct current power supply after being connected in series.

A primary side of the transformer 104 is connected in parallel to two terminals of the first power transistor 101 through the primary-side resonant capacitor 103, and a secondary side of the transformer 104 is coupled to the third power transistor 105 and the secondary-side resonant capacitor 106.

It should be noted that "coupling" described in this application refers to a direct connection or an indirect connection. For example, coupling A and B may represent that A is connected to B, which may be that A is directly connected to B, or may be that A is indirectly connected to B through one or more other electronic components, for example, may be that A is directly connected to C, and C is directly connected to B, so that A is connected to B through C.

The asymmetrical half-bridge flyback converter includes a plurality of power transistors. The power transistors may be power semiconductor devices. Distribution locations of the plurality of power transistors in the asymmetrical half-bridge flyback converter are different, and other devices respectively connected to the plurality of power transistors are different. For example, the asymmetrical half-bridge flyback converter includes three power transistors: the first power transistor 101, the second power transistor 102, and the third power transistor 105. The first power transistor 101 and the second power transistor 102 may be switching transistors. The first power transistor 101 and the second power transistor 102 are coupled to the two terminals of the direct current power supply after being connected in series. The first power transistor 101 and the second power transistor 102 may be separately turned on and off under control of a controller, and the controller may be connected to the asymmetrical half-bridge flyback converter.

Figure 3:
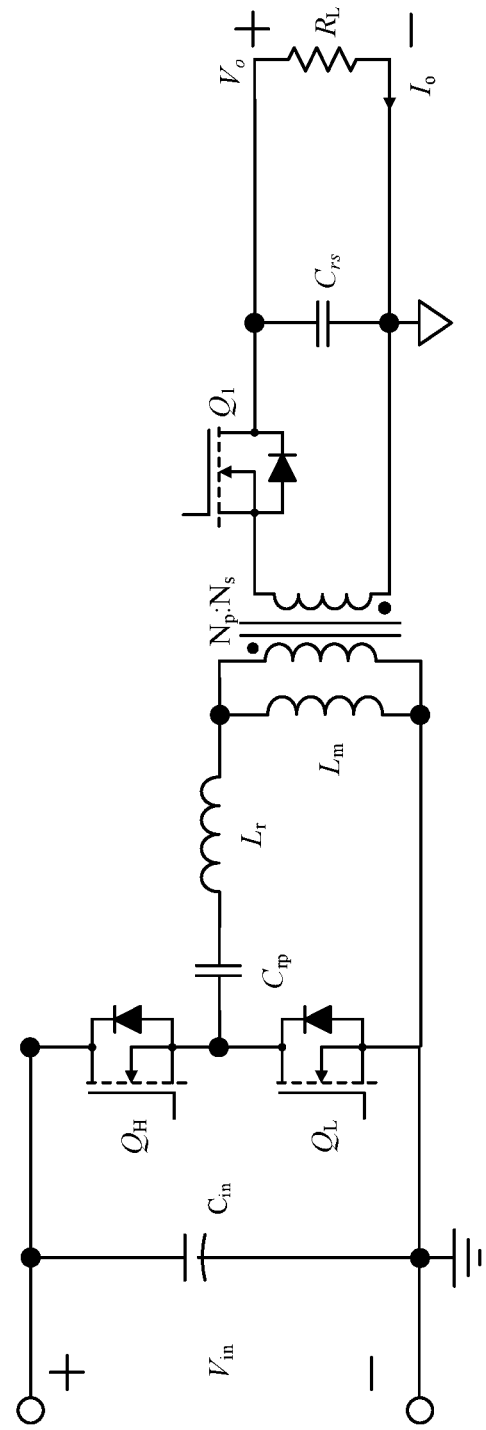
FIG. 3 is a circuit diagram of an asymmetrical half-bridge flyback converter according to an embodiment of this application.

The first power transistor 101 and the second power transistor 102 are connected in series, and then the first power transistor 101 and the second power transistor 102 are separately connected to the transformer 104. As shown in FIG. 1, the transformer 104 is connected in series to the primary-side resonant capacitor 103 and then is connected in parallel to the two terminals of the first power transistor 101; or the transformer 104 is connected in series to the primary-side resonant capacitor 103 and then is connected in parallel to two terminals of the second power transistor 102. An example in which the transformer 104 is connected in series to the primary-side resonant capacitor 103 and then is connected in parallel to the two terminals of the first power transistor 101 is used for description in the subsequent figures. Both the first power transistor 101 and the second power transistor 102 may be switching transistors. For example, the first power transistor 101 is a first switching transistor, and the second power transistor 102 is a second switching transistor. In FIG. 3, an example in which the first switching transistor is an upper transistor and the second switching transistor is a lower transistor is used for description.

In this embodiment of this application, an example in which each switching transistor is a metal-oxide-semiconductor field-effect transistor (MOSFET) is used for description. It should be understood that each switching transistor may alternatively be another semiconductor device, for example, an insulated gate bipolar transistor (IGBT).

In the asymmetrical half-bridge flyback converter provided in this embodiment of this application, in addition to including the first power transistor 101 and the second power transistor 102, the asymmetrical half-bridge flyback converter may include the third power transistor 105. The third power transistor 105 may belong to a rectifier circuit, and the rectifier circuit may include the third power transistor 105 and the secondary-side resonant capacitor 106. The third power transistor 105 and the secondary-side resonant capacitor 106 are coupled to the secondary side of the transformer 104, for example, the third power transistor 105 and the secondary-side resonant capacitor 106 are connected in parallel to the secondary side of the transformer 104 after being connected in series.

The third power transistor 105 may play a role of rectification in the asymmetrical half-bridge flyback converter. As a power of the asymmetrical half-bridge flyback converter increases, when an output voltage of the secondary side of the transformer remains unchanged, a difference between a root mean square value and an average value of a current flowing through the third power transistor further increases. A larger difference indicates a larger turn-on loss of the third power transistor. The average value of the current flowing through the third power transistor is determined by a direct current load. However, control parameters and circuit parameters of the asymmetrical half-bridge flyback converter may be adjusted to reduce the root mean square value of the current, so that a turn-on loss of the third power transistor is reduced. In this embodiment of this application, the third power transistor 105 and the secondary-side resonant capacitor 106 are connected in series, and the control parameters and the circuit parameters of the asymmetrical half-bridge flyback converter are adjusted through cooperation of the primary-side resonant capacitor 103 and the secondary-side resonant capacitor 106 in the asymmetrical half-bridge flyback converter, so that the root mean square value of the current flowing through the third power transistor can be reduced, thereby reducing the turn-on loss of the third power transistor.

In some embodiments of this application, the third power transistor includes at least one of the following: a synchronous rectifier (SR) and a diode. For example, the third power transistor is the synchronous rectifier, and the synchronous rectifier plays a role of rectification. When the output voltage of the secondary side of the transformer remains unchanged, in this embodiment of this application, the synchronous rectifier and the secondary-side resonant capacitor 106 are connected in series, and the control parameters and the circuit parameters of the asymmetrical half-bridge flyback converter can be adjusted through cooperation of the primary-side resonant capacitor 103 and the secondary-side resonant capacitor 106 in the asymmetrical half-bridge flyback converter, so that the root mean square value of the current flowing through the third power transistor can be reduced, thereby reducing a turn-on loss of the synchronous rectifier. In addition, the synchronous rectifier may be replaced by the diode to implement a rectification function, and the control parameters and the circuit parameters of the asymmetrical half-bridge flyback converter can be adjusted through cooperation of the primary-side resonant capacitor 103 and the secondary-side resonant capacitor 106 in the asymmetrical half-bridge flyback converter, so that a root mean square value of a current flowing through the diode can be reduced, thereby reducing a turn-on loss of the diode.

In this embodiment of this application, the transformer includes an excitation inductor and a transformer leakage inductor. It may be understood that the excitation inductor, the transformer leakage inductor, and an ideal transformer may be specifically implemented as an actual transformer. The transformer has a primary-side winding and a secondary-side winding, and a ratio of a quantity of turns of the primary-side winding to a quantity of turns of the secondary-side winding of the transformer may be represented as $N_p/N_s$. $N_p$ represents the quantity of the turns of the primary-side winding of the transformer, $N_s$ represents the quantity of the turns of the secondary-side winding of the transformer, and "/" is a division sign. In addition, $N_p/N_s$ may alternatively be represented as $N_p:N_s$, and ":" is a division sign.

In this embodiment of this application, the asymmetrical half-bridge flyback converter includes at least two capacitors. At least one of the at least two capacitors is configured to form a resonant circuit with the transformer leakage inductor. Based on a location relationship with the transformer, the at least two capacitors may be classified into a primary-side capacitor and a secondary-side capacitor. When a capacitor participates in resonance, the capacitor may also be referred to as "a resonant capacitor". For example, when the primary-side capacitor participates in the resonance, the primary-side capacitor may also be referred to as "a primary-side resonant capacitor"; and when the secondary-side capacitor participates in the resonance, the secondary-side capacitor may also be referred to as "a secondary-side resonant capacitor".

The asymmetrical half-bridge flyback converter provided in this embodiment of this application includes both the primary-side resonant capacitor and the secondary-side resonant capacitor. The secondary side of the transformer is coupled to the third power transistor and the secondary-side resonant capacitor, and the third power transistor and the secondary-side resonant capacitor are in a series relationship. A parameter of a resonant circuit including the primary-side resonant capacitor and the secondary-side resonant capacitor is adjusted, so that a waveform of the current of the third power transistor is closer to an average value line of a current of the secondary-side winding as a whole, and the root mean square value of the current of the third power transistor is closer to an average value of the current of the secondary-side winding, thereby reducing the turn-on loss of the third power transistor.

The direct current power supply is connected to the first power transistor and the second power transistor. For example, the direct current power supply may be an energy storage battery (for example, a nickel-cadmium battery, a nickel-hydrogen battery, a lithium-ion battery, or a lithium-polymer battery), a solar cell, an AC/DC converter (alternating-current/direct-current converter), or another DC/DC converter (for example, a BUCK converter, a BOOST converter, or a BUCK-BOOST converter).

In the asymmetrical half-bridge flyback converter provided in this embodiment of this application, the secondary side of the transformer 104 may be further coupled to the direct current load after being coupled to the third power transistor 105 and the secondary-side resonant capacitor 106. For example, the direct current load may be a resistor, a mobile phone terminal, an energy storage battery, another DC/DC converter and/or DC/AC converter (direct-current/alternating-current converter), or the like.

FIG. 3 is a circuit diagram of an asymmetrical half-bridge flyback converter. The asymmetrical half-bridge flyback converter includes: a first power transistor $Q_L$, a second power transistor $Q_H$, a primary-side resonant capacitor $C_{rp}$, a transformer leakage inductor $L_r$, an excitation inductor $L_m$, a third power transistor $Q_1$, and a secondary-side resonant capacitor $C_{rs}$.

The first power transistor $Q_L$ and the second power transistor $Q_H$ are coupled to two terminals of a direct current power supply $V_{in}$ after being connected in series.

A primary side of the transformer is connected in parallel to two terminals of the first power transistor $Q_L$ through the primary-side resonant capacitor $C_{rp}$, and a secondary side of the transformer is coupled to the third power transistor $Q_1$ and the secondary-side resonant capacitor $C_{rs}$. For example, in FIG. 3, an example in which the third power transistor $Q_1$ is a synchronous rectifier SR is used for description.

In FIG. 3, an example in which the first power transistor is a first switching transistor $Q_L$, the second power transistor is a second switching transistor $Q_H$, and the third power transistor $Q_1$ is the synchronous rectifier is used for description. In addition, $N_p:N_s$ is a ratio of a quantity of turns of a primary-side winding to a quantity of turns of a secondary-side winding of the transformer, $V_O$ represents an output voltage, $I_O$ represents an output current, and $R_L$ represents a load. It may be understood that the excitation inductor, the transformer leakage inductor, and an ideal transformer may be specifically implemented as an actual transformer.

It should be noted that in FIG. 3, an example in which the third power transistor $Q_1$ is connected to a positive electrode of the secondary-side resonant capacitor is used for description. This is not limited, and the third power transistor $Q_1$ may alternatively be connected to a negative electrode of the secondary-side resonant capacitor. Details are not described herein with a figure again, and a connection manner of the third power transistor $Q_1$ and the secondary-side resonant capacitor is not limited.

The first switching transistor and the second switching transistor are coupled to the two terminals of the direct current power supply $V_{in}$ after being connected in series. To be specific, a drain of the first switching transistor is coupled to a source of the second switching transistor, a drain of the second switching transistor is coupled to a positive electrode of the direct current power supply $V_{in}$, and a source of the first switching transistor is coupled to a negative electrode of the direct current power supply $V_{in}$. Optionally, the two terminals of the direct current power supply $V_{in}$ are connected in parallel to a filter capacitor Cm. The primary side of the transformer is connected in parallel to two terminals of the first switching transistor through the primary-side resonant capacitor. For example, the drain of the first switching transistor is coupled to one terminal of the primary-side resonant capacitor, the other terminal of the primary-side resonant capacitor is coupled to one side of the primary side of the transformer, and the other side of the primary side of the transformer is coupled to the source of the first switching transistor. The secondary side of the transformer is coupled to a direct current load, for example, one side of the secondary side of the transformer is coupled to a source of the third power transistor $Q_1$, a drain of the third power transistor $Q_1$ is coupled to one terminal of the secondary-side resonant capacitor and one terminal of the load, and the other terminal of the secondary-side resonant capacitor and the other terminal of the load are coupled to the other side of the secondary side of the transformer. For example, one side of the primary side of the transformer, for example, an upper side, and the other side of the secondary side of the transformer, for example, a lower side, are dotted terminals, or the other side of the primary side of the transformer, for example, a lower side, and one side of the secondary side of the transformer, for example, an upper side, are dotted terminals.

It may be understood that in FIG. 3, an example in which a load resistor represents the direct current load is used for description. The direct current load coupled to the asymmetrical half-bridge flyback converter is not limited in this embodiment of this application. In addition, the third power transistor $Q_1$ shown in FIG. 3 may be replaced by a diode to implement a rectification function.

In some embodiments of this application, the transformer includes an excitation inductor and a transformer leakage inductor.

When the first power transistor is turned on, the primary-side resonant capacitor, the secondary-side resonant capacitor, and the transformer leakage inductor participate in resonance, and the resonance is hybrid resonance.

Turn-on of the first power transistor can be controlled. In this case, in the asymmetrical half-bridge flyback converter, the primary-side resonant capacitor, the secondary-side resonant capacitor, and the transformer leakage inductor participate in the resonance, and the resonance is hybrid resonance. Because the secondary-side resonant capacitor is used in a circuit of the asymmetrical half-bridge flyback converter to implement the hybrid resonance, an original resonance current waveform is effectively improved, a root mean square value of a current flowing through the third power transistor $Q_1$ is reduced, a turn-on loss of the third power transistor is reduced, and efficiency of the asymmetrical half-bridge flyback converter is improved.

In some embodiments of this application, the transformer includes an excitation inductor and a transformer leakage inductor.

When the first power transistor is turned on, the secondary-side resonant capacitor and the transformer leakage inductor participate in resonance, the primary-side capacitor of the transformer does not participate in the resonance, the resonance is secondary-side resonance, and the primary-side capacitor is a capacitor coupled to the primary side of the transformer.

Turn-on of the first power transistor can be controlled. In this case, in a circuit of the asymmetrical half-bridge flyback converter, the secondary-side resonant capacitor and the transformer leakage inductor participate in the resonance, the primary-side capacitor of the transformer does not participate in the resonance, the resonance is secondary-side resonance, and the primary-side capacitor is a capacitor coupled to the primary side of the transformer. Although the primary-side capacitor is in a resonant circuit, the primary-side capacitor can be considered as a constant voltage source. Because the secondary-side resonant capacitor is used in the circuit of the asymmetrical half-bridge flyback converter to implement the secondary-side resonance, a resonance current waveform is effectively improved, a root mean square value of a current of the secondary-side resonance is reduced, a turn-on loss of the third power transistor is reduced, and efficiency of the asymmetrical half-bridge flyback converter is improved.

In some embodiments of this application, the transformer includes an excitation inductor and a transformer leakage inductor.

When the first power transistor is turned on, the primary-side resonant capacitor and the transformer leakage inductor participate in resonance, a secondary-side capacitor of the transformer does not participate in the resonance, the resonance is primary-side resonance, and the secondary-side capacitor is a capacitor coupled to the secondary side of the transformer.

Turn-on of the first power transistor can be controlled. In this case, in a circuit of the asymmetrical half-bridge flyback converter, the primary-side resonant capacitor and the transformer leakage inductor participate in the resonance, the secondary-side capacitor of the transformer does not participate in the resonance, and the resonance is primary-side resonance. Although the secondary-side capacitor is in a resonant circuit, the secondary-side capacitor can be considered as a constant voltage source. The secondary-side capacitor is a capacitor coupled to the secondary side of a transformer.

In some embodiments of this application, a parameter of the hybrid resonance is adjusted, to reduce a root mean square value of a current flowing through the third power transistor.

In a scenario in which the hybrid resonance is formed in the circuit of the asymmetrical half-bridge flyback converter, to further reduce the root mean square value of the current flowing through the third power transistor, the parameter of the hybrid resonance can be adjusted, to reduce the root mean square value of the current flowing through the third power transistor, thereby reducing the turn-on loss of the third power transistor. The parameter of the hybrid resonance is a parameter of a circuit that forms the hybrid resonance, for example, a parameter of a resonant element (the transformer leakage inductor, a resonant capacitor, or the like) in the circuit that forms the hybrid resonance is adjusted. The parameter of the hybrid resonance may also be referred to as a resonant circuit parameter. A process of specifically adjusting the parameter of the hybrid resonance is not limited in this embodiment of this application. For example, how to adjust the parameter of the hybrid resonance may be determined based on a specific circuit, in the asymmetrical half-bridge flyback converter, that forms the hybrid resonance.

In some embodiments of this application, the adjustment of the parameter of the hybrid resonance includes at least one of the following: adjusting the primary-side resonant capacitor, adjusting the secondary-side resonant capacitor, and adjusting a ratio of a capacitance value of the primary-side resonant capacitor to an equivalent capacitance value of the secondary-side resonant capacitor on the primary side.

The ratio of the capacitance value of the primary-side resonant capacitor to the equivalent capacitance value of the secondary-side resonant capacitor on the primary side is represented as $$\frac{C_{rp}N_p^2}{C_{rs}N_s^2}.$$

$C_{rp}$ represents the capacitance value of the primary-side resonant capacitor, $$\frac{C_{rs}N_s^2}{N_p^2}$$

represents the equivalent capacitance value of the secondary-side resonant capacitor on the primary side, $C_{rs}$ represents a capacitance value of the secondary-side resonant capacitor, $N_p$ represents a quantity of turns of a primary-side winding of the transformer, and $N_s$ represents a quantity of turns of a secondary-side winding of the transformer.

Specifically, the equivalent capacitance value of the secondary-side resonant capacitor on the primary side is a corresponding capacitance value when the capacitance value of the secondary-side resonant capacitor is equivalent to the primary side. Parameters of the hybrid resonance may include: the capacitance value of the primary-side resonant capacitor, the capacitance value of the secondary-side resonant capacitor, and a value of the ratio of the capacitance value of the primary-side resonant capacitor to the equivalent capacitance value of the secondary-side resonant capacitor on the primary side.

The ratio of the capacitance value of the primary-side resonant capacitor to the equivalent capacitance value of the secondary-side resonant capacitor on the primary side is represented as $$\frac{C_{rp}N_p^2}{C_{rs}N_s^2}.$$

Therefore, an expression of the ratio is adjusted, to reduce the root mean square value of the current flowing through the third power transistor. For example, $C_{rp}$ or $C_{rs}$ may be adjusted, or a ratio of the quantity of the turns of the primary-side winding to the quantity of the turns of the secondary-side winding of the transformer is adjusted. A detailed adjustment amount is not limited in this embodiment of this application, and needs to be determined with reference to a specific application scenario. In this embodiment of this application, a ratio of the hybrid resonance is adjusted to improve a waveform of the current of the third power transistor, so that a root mean square value of a current of the secondary-side winding is as small as possible, thereby reducing the turn-on loss of the third power transistor.

In some embodiments of this application, the adjustment of the parameter of the hybrid resonance includes: adjusting initial state values of the hybrid resonance.

The initial state values of the hybrid resonance refer to state values of resonant elements, in an initial state, of a hybrid resonant circuit when the primary-side resonant capacitor, the secondary-side resonant capacitor, and the transformer leakage inductor participate in the resonance to form the hybrid resonant circuit, and the resonant elements include the primary-side resonant capacitor, the secondary-side resonant capacitor, and the transformer leakage inductor. For example, the initial state values of the hybrid resonance include an initial current value of the transformer leakage inductor (namely, a resonant inductor) and an initial voltage value of a resonant capacitor (namely, a capacitor that participates in the resonance). Therefore, the initial state values of the hybrid resonance are adjusted to reduce the root mean square value of the current of the third power transistor. A detailed adjustment amount is not limited in this embodiment of this application, and needs to be determined with reference to a specific application scenario. In this embodiment of this application, the initial state values of the hybrid resonance are adjusted to improve the waveform of the current of the third power transistor, so that a root mean square value of a current of the secondary-side winding is as small as possible, thereby reducing the turn-on loss of the third power transistor.

Specifically, the initial state values of the hybrid resonance may be adjusted by changing a capacitance value of a second capacitor. For example, the asymmetrical half-bridge flyback converter further includes a second capacitor, and the second capacitor is connected in parallel to the third power transistor; and the second capacitor is configured to adjust the initial state values of the hybrid resonance. For example, the second capacitor may be $C_b$ in the subsequent figures.

The second capacitor is connected in parallel to the third power transistor. For example, the second capacitor may be specifically a ceramic capacitor. The initial state values of the hybrid resonance can be adjusted by changing the capacitance value of the second capacitor. In this embodiment of this application, the initial state values of the hybrid resonance are adjusted to improve the waveform of the current of the third power transistor, so that the root mean square value of the current of the secondary-side winding is as small as possible, thereby reducing the turn-on loss of the third power transistor.

In some embodiments of this application, a parameter of the secondary-side resonance is adjusted, to reduce a root mean square value of a current flowing through the third power transistor.

In a scenario in which the secondary-side resonance is formed in the circuit of the asymmetrical half-bridge flyback converter, to further reduce the root mean square value of the current flowing through the third power transistor, the parameter of the secondary-side resonance can be adjusted, to reduce the root mean square value of the current flowing through the third power transistor, thereby reducing the turn-on loss of the third power transistor. The parameter of the secondary-side resonance is a parameter of a circuit that forms the secondary-side resonance, for example, a parameter of a resonant element (the transformer leakage inductor, the secondary-side resonant capacitor, or the like) in the circuit that forms the secondary-side resonance is adjusted. The parameter of the secondary-side resonance may also be referred to as a secondary-side resonant circuit parameter. A process of specifically adjusting the parameter of the secondary-side resonance is not limited in this embodiment of this application. For example, how to adjust the parameter of the secondary-side resonance may be determined based on a specific circuit, in the asymmetrical half-bridge flyback converter, that forms the secondary-side resonance.

In some embodiments of this application, the adjustment of the parameter of the secondary-side resonance includes: adjusting the secondary-side resonant capacitor.

A capacitance value of the secondary-side resonant capacitor can be adjusted. A detailed adjustment amount is not limited in this embodiment of this application, and needs to be determined with reference to a specific application scenario. In this embodiment of this application, the secondary-side resonant capacitor is adjusted to improve the waveform of the current of the third power transistor, so that a root mean square value of a current of the secondary-side winding is as small as possible, thereby reducing the turn-on loss of the third power transistor.

In some embodiments of this application, the adjustment of the parameter of the secondary-side resonance includes: adjusting resonant element initial state values of the secondary-side resonance.

The asymmetrical half-bridge flyback converter further includes a second capacitor, and the second capacitor is connected in parallel to the third power transistor.

The second capacitor is configured to adjust the initial state values of the secondary-side resonance.

The initial state values of the secondary-side resonance refer to state values of resonant elements, in an initial state, of a secondary-side resonant circuit when the secondary-side resonant capacitor and the transformer leakage inductor participate in the resonance to form the secondary-side resonant circuit, and the resonant elements include the secondary-side resonant capacitor and the transformer leakage inductor. For example, the initial state values of the secondary-side resonance include an initial current value of the transformer leakage inductor (namely, a resonant inductor) and an initial voltage value of a resonant capacitor (namely, a capacitor that participates in the resonance). Therefore, the initial state values of the secondary-side resonance are adjusted to reduce the root mean square value of the current of the third power transistor. A detailed adjustment amount is not limited in this embodiment of this application, and needs to be determined with reference to a specific application scenario. In this embodiment of this application, the initial state values of the secondary-side resonance are adjusted to improve the waveform of the current of the third power transistor, so that a root mean square value of a current of the secondary-side winding is as small as possible, thereby reducing the turn-on loss of the third power transistor.

Specifically, the initial state values of the secondary-side resonance may be adjusted by changing a capacitance value of a second capacitor. For example, the asymmetrical half-bridge flyback converter further includes a second capacitor, and the second capacitor is connected in parallel to the third power transistor; and the second capacitor is configured to adjust the initial state values of the secondary-side resonance. For example, the second capacitor may be $C_b$ in the subsequent figures.

The second capacitor is connected in parallel to the third power transistor. For example, the second capacitor may be specifically a ceramic capacitor. The initial state values of the secondary-side resonance can be adjusted by changing the capacitance value of the second capacitor. In this embodiment of this application, the initial state values of the secondary-side resonance are adjusted to improve the waveform of the current of the third power transistor, so that the root mean square value of the current of the secondary-side winding is as small as possible, thereby reducing the turn-on loss of the third power transistor.

Further, in an implementation scenario in which the second capacitor is connected in parallel to the third power transistor, the asymmetrical half-bridge flyback converter further includes a first resistor, and the first resistor and the second resistor are connected in series.

The first resistor is configured to reduce a current surge on the third power transistor and reduce current oscillation when the third power transistor is turned on.

After the second capacitor and the first resistor are connected in series, the second capacitor and the first resistor are connected in parallel to the third power transistor. When the third power transistor is turned on, the current surge on the third power transistor and the current oscillation can be reduced by using a damping effect of the first resistor on a current. For example, the first resistor and the second capacitor form a snubber circuit. The snubber circuit is connected in parallel to the third power transistor, and the electromagnetic compatibility (EMC) is improved by adding the snubber circuit. For example, the first resistor may be $R_b$ in the subsequent figures.

In some embodiments of this application, the asymmetrical half-bridge flyback converter further includes a filter.

The filter is connected in parallel to the secondary-side resonant capacitor.

The filter is configured to reduce ripples of an output voltage of the asymmetrical half-bridge flyback converter.

A specific implementation form of the filter further included in the asymmetrical half-bridge flyback converter is not limited. The filter is connected in parallel to the secondary-side resonant capacitor, and the filter is configured to reduce the ripples of the output voltage of the asymmetrical half-bridge flyback converter, so that the output voltage is more stable. In addition, the filter is further configured to reduce electromagnetic interference and improve electromagnetic compatibility.

In some embodiments of this application, the filter includes a first inductor and a first capacitor.

The first inductor is configured to reduce ripples of the first capacitor.

The secondary-side resonant capacitor is further configured to reduce the ripples of the first capacitor, and reduce a loss caused by an equivalent series resistance (ESR) of the first capacitor.

The first inductor and the first capacitor are connected in series, and the first inductor is configured to reduce the ripples of the first capacitor. The secondary-side resonant capacitor is connected in parallel to the first capacitor through the first inductor. Therefore, the secondary-side resonant capacitor is further configured to reduce the ripples of the first capacitor, and reduce the loss caused by the ESR of the first capacitor. For example, the first capacitor may be $C_O$ in the subsequent figures, and the first inductor may be $L_f$ in the subsequent figures. The first capacitor may be specifically an electrolytic capacitor. An implementation of the first capacitor is not limited in this embodiment of this application.

Further, in some embodiments of this application, the filter includes a single-stage LC filter and a multi-stage LC filter.

Specifically, the filter includes the single-stage LC filter, for example, the single-stage LC filter includes the first inductor and the first capacitor. For another example, the filter includes the multi-stage LC filter, and the multi-stage LC filter may be considered as being obtained by connecting a plurality of single-stage LC filters in series. By using the plurality of filters, the ripples of the output voltage of the asymmetrical half-bridge flyback converter are reduced, so that the output voltage is more stable.

In some embodiments of this application, the first power transistor is an upper transistor, and the second power transistor is a lower transistor. That is, the primary side of the transformer is connected in parallel to two terminals of the upper transistor. In this case, the asymmetrical half-bridge flyback converter is an asymmetrical half-bridge flyback converter in which the transformer is connected to an upper half-bridge arm. Alternatively, the first power transistor is a lower transistor, and the second power transistor is an upper transistor. That is, the primary side of the transformer is connected in parallel to two terminals of the lower power transistor. In this case, the asymmetrical half-bridge flyback converter is an asymmetrical half-bridge flyback converter in which the transformer is connected to a lower half-bridge arm.

It can be learned from the descriptions of the examples in the foregoing embodiments of this application that the asymmetrical half-bridge flyback converter includes: the first power transistor, the second power transistor, the primary-side resonant capacitor, the transformer, the third power transistor, and the secondary-side resonant capacitor, where the first power transistor and the second power transistor are coupled to the two terminals of the direct current power supply after being connected in series; and the primary side of the transformer is connected in parallel to the two terminals of the first power transistor through the primary-side resonant capacitor, and the secondary side of the transformer is coupled to the third power transistor and the secondary-side resonant capacitor. Because the primary side of the transformer is coupled to the primary-side resonant capacitor, and the secondary side of the transformer is coupled to the secondary-side resonant capacitor, the waveform of the current flowing through the third power transistor can be adjusted through cooperation of the primary-side resonant capacitor and the secondary-side resonant capacitor, so that the root mean square value of the current flowing through the third power transistor is reduced, thereby reducing the turn-on loss of the third power transistor, and improving the efficiency of the asymmetrical half-bridge flyback converter.

The following uses a detailed application scenario as an example to describe the embodiments of this application.

Figure 4:
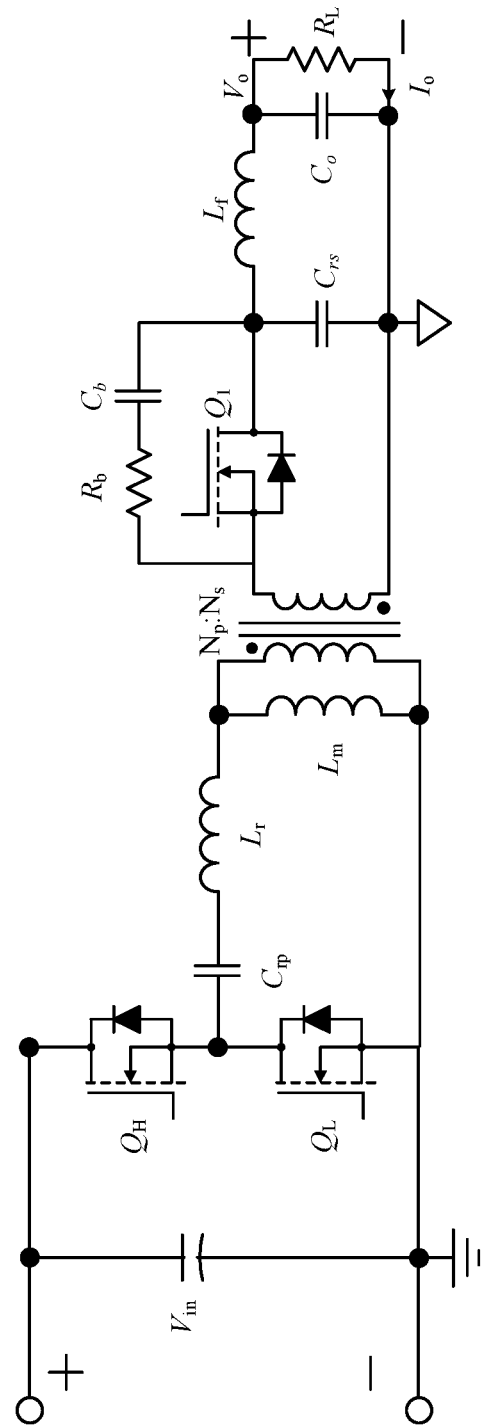
FIG. 4 is a circuit diagram of an asymmetrical half-bridge flyback converter according to an embodiment of this application.

FIG. 4 is a circuit diagram of an asymmetrical half-bridge flyback converter according to an embodiment of this application. The asymmetrical half-bridge flyback converter includes: a first power transistor $Q_L$, a second power transistor $Q_H$, a primary-side resonant capacitor $C_{rp}$, a transformer leakage inductor $L_r$, an excitation inductor $L_m$, a third power transistor $Q_1$, and a secondary-side resonant capacitor $C_{rs}$. For example, in the figure, an example in which the third power transistor $Q_1$ is a synchronous rectifier is used for description, and in a subsequent example, an example in which $Q_1$ is specifically an SR is used. Compared with FIG. 3, the asymmetrical half-bridge flyback converter shown in FIG. 4 further includes a first resistor $R_b$, a second capacitor $C_b$, and an LC filter. The LC filter includes a first inductor $L_f$ and a first capacitor $C_O$. FIG. 4 shows an asymmetrical half-bridge flyback converter in which the transformer is connected to a lower half-bridge arm. A waveform of a current flowing through the third power transistor may be adjusted through hybrid resonance, so that a root mean square value of the current flowing through the third power transistor is reduced, and a turn-on loss of the third power transistor is reduced. In addition, the secondary-side resonant capacitor is further configured to reduce ripples of the first capacitor $C_0$, and reduce a turn-on loss caused by an equivalent series resistance of the first capacitor.

An embodiment of this application provides a circuit for hybrid resonance of a switching converter, and the circuit is used in an asymmetrical half-bridge flyback circuit, where $Q_L$ is a lower transistor, $Q_H$ is an upper transistor, a yin voltage is a direct current voltage on an input side, a $V_O$ voltage is a direct current voltage on an output side, and an $I_O$ current is a direct current on the output side.

Figure 5:
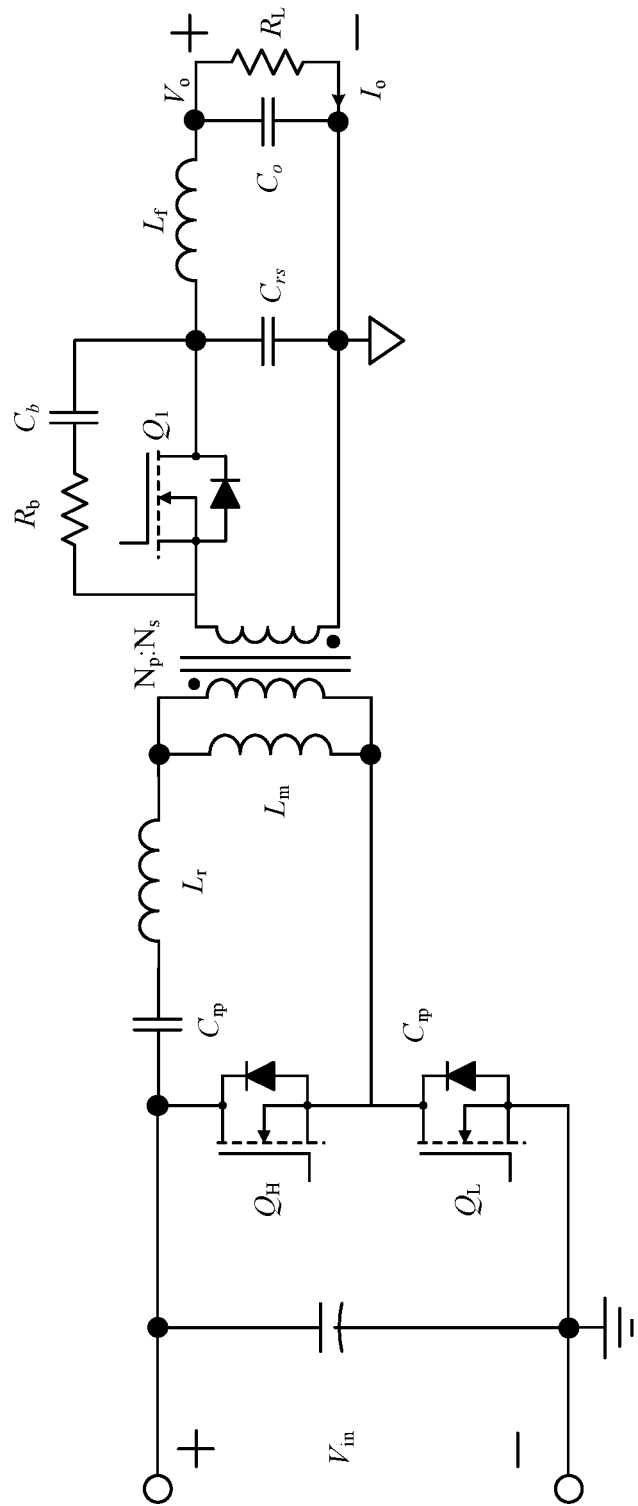
FIG. 5 is a circuit diagram of an asymmetrical half-bridge flyback converter according to an embodiment of this application.

FIG. 5 is a circuit diagram of an asymmetrical half-bridge flyback converter according to an embodiment of this application. Compared with FIG. 4, the asymmetrical half-bridge flyback converter shown in FIG. 5 is an asymmetrical half-bridge flyback converter in which a transformer is connected to an upper half-bridge arm. A difference between FIG. 5 and FIG. 4 lies in that the bridge arm connected to the transformer in FIG. 5 is different from the bridge arm connected to the transformer in FIG. 4.

Figure 6:
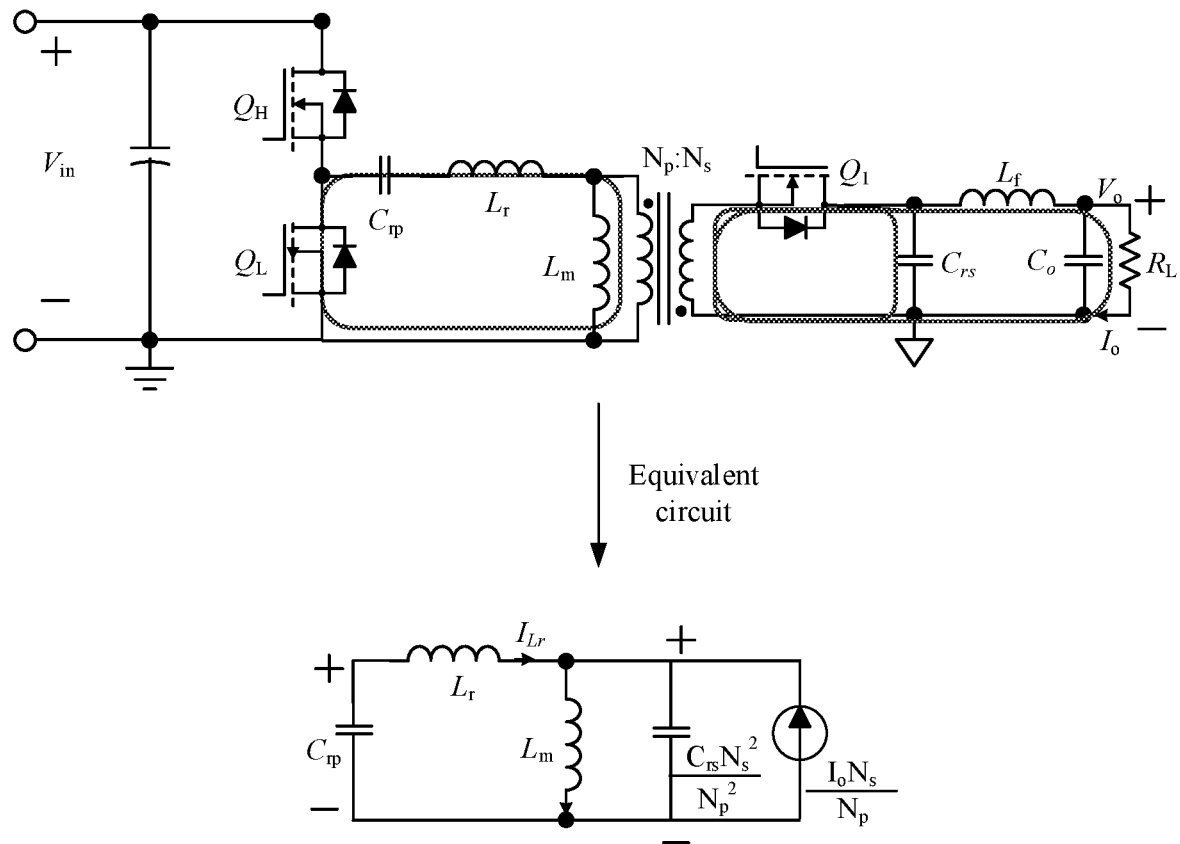
FIG. 6 is an equivalent circuit diagram of a hybrid resonant circuit according to an embodiment of this application.

FIG. 6 is an equivalent circuit diagram of a hybrid resonant circuit according to an embodiment of this application. In an upper part shown in FIG. 6, three current circuits are formed when a first switching transistor $Q_L$ is turned on. The three current circuits are respectively a first current circuit formed by a primary-side resonant capacitor $C_{rp}$, $L_r$, $L_m$, and a primary side of an ideal transformer, a second current circuit formed by a secondary side of the ideal transformer, $Q_1$, and $C_{rs}$, and a third current circuit formed by the secondary side of the ideal transformer, $Q_1$, $L_r$, $C_0$, and a direct current load. An equivalent circuit of the three current circuits formed when the first switching transistor $Q_L$ is turned on is shown in a lower part of FIG. 6. $I_0$ in FIG. 6 is an output current of the direct current load, $$\frac{C_{rs}N_S^2}{N_P^2}$$

represents an equivalent capacitance of $C_{rs}$ on the primary side, and $$\frac{I_0 N_S}{N_P}$$

represents an equivalent current of $I_0$ on the primary side.

Figure 7:
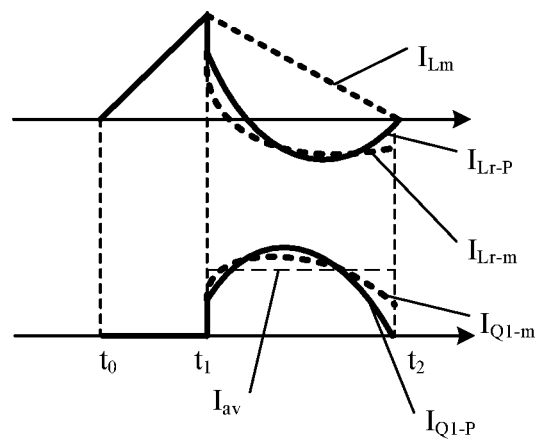
FIG. 7 is a schematic diagram of a current change of an asymmetrical half-bridge flyback converter according to an embodiment of this application.

FIG. 7 is a schematic diagram of a current change of an asymmetrical half-bridge flyback converter according to an embodiment of this application. It can be seen from FIG. 7 that $I_{Q1}$ represents a secondary-side current flowing through a third power transistor, $I_{LM}$ represents a primary-side excitation current, $I_{Lr}$ represents a primary-side current, $t_1-t_0=D*T$, and $t_2-t_1=(1-D)*T$. * represents multiplication, D is a duty cycle of the asymmetrical half-bridge flyback converter, and T is a switching cycle of the asymmetrical half-bridge flyback converter.

From a moment $t_0$ to a moment $t_1$, a second switching transistor $Q_H$ is in a turn-on state. In this case, the primary-side resonant capacitor $C_{rp}$ forms a closed circuit with the excitation inductor and a transformer leakage inductor by using the second switching transistor, a current case of the excitation inductor approximates a linear increase, and a secondary-side winding of the transformer outputs no current. From the moment $t_1$ to a moment $t_2$, the first switching transistor $Q_L$ is in a turn-on state. In the three current circuits shown in FIG. 6, the current case of the excitation inductor approximates a linear decrease, and both a current of a primary-side winding under primary-side resonance and a current of the primary-side winding under hybrid resonance are in sinusoidal waveforms.

Various current values shown in FIG. 7 meet the following relationship:

$$\frac{I_{Lm} - I_{Lr-P}}{I_{Q_1-P}} = \frac{N_S}{N_P} \text{ and } \frac{I_{Lm} - I_{Lr-m}}{I_{Q_1-m}} = \frac{N_S}{N_P}$$

$I_{Lm}$ represents the primary-side excitation current, $I_{Lr-P}$ represents the current of the primary-side winding under the primary-side resonance, $I_{Q_1-P}$ represents a current of a secondary-side winding under the primary-side resonance, $I_{Lr-m}$ represents the current of the primary-side winding under the hybrid resonance, and $I_{Q_1-m}$ represents a current of the secondary-side winding under the hybrid resonance.

$I_{av}$ represents an average value of a current flowing through the third power transistor when the third power transistor is turned on, $I_{av}=I_0/(1-D)$, D is the duty cycle of the asymmetrical half-bridge flyback converter, and $D=V_0/V_{in}$. $V_0$ is an output voltage, and $V_{in}$ is an input voltage.

The current of the secondary-side winding under the hybrid resonance is closer to an average value of a current of the secondary-side winding (the third power transistor). When the average value of the current of the secondary-side winding remains unchanged, a root mean square value of the current of the secondary-side winding can be reduced by adjusting a parameter of the hybrid resonance, thereby reducing a turn-on loss of the third power transistor.

In this embodiment of this application, there are a plurality of implementations for adjusting the parameter of the hybrid resonance. For example, the following two adjustment manners may be included.

(1) A ratio $$\left(\frac{C_{rp}N_p^2}{C_{rs}N_s^2}\right)$$

of the hybrid resonance is adjusted, to adjust a waveform of a current of the third power transistor, so that the root mean square value of the current of the secondary-side winding is as small as possible, $I_{RMS}/I_{av}$ is as small as possible, and the turn-on loss of the third power transistor is reduced. $I_{RMS}$ represents a root mean square value of the current flowing through the third power transistor when the third power transistor is turned on, and $I_{av}$ represents the average value of the current flowing through the third power transistor when the third power transistor is turned on.

(2) Resonance state initial values are adjusted, to adjust a waveform of a current of the third power transistor, so that $I_{RMS}/I_{av}$ is as small as possible, and the turn-on loss of the third power transistor is reduced.

Then, implementation processes of the primary-side resonance, the secondary-side resonance, and the hybrid resonance are described in terms of an operation principle.

When only the primary-side resonant capacitor participates in resonance, the secondary-side capacitor is considered as a constant voltage source, and a state equation of a resonant circuit is as follows:

$$\begin{cases} L_r \dfrac{di}{dt} - V_{Crp} = \dfrac{N_P V_0}{N_S} \\ C_{rp} \dfrac{dV_{rp}}{dt} = -i_{Lr} \end{cases}$$

$V_{Crp}$) is a difference between voltages at both terminals of $C_{rp}$, $i_{Lr}$ is a value of a current flowing through $L_r$, $L_r$ represents a value of an inductance of the transformer leakage inductor, $V_0$ is an output voltage, and $N_p/N_s$ is a ratio of a quantity of turns of the primary-side winding to a quantity of turns of the secondary-side winding of the transformer.

In this case, the primary-side current $i_{Lr}$ is:

$$i_{Lr} = \left( \dfrac{V_{Crp0} + \dfrac{N p V_0}{N s}}{Z} \right) \sin\omega(t - t_0) + I_{Lr0} \cos\omega(t - t_0)$$

$V_{Crp0}$ is an initial voltage value of $C_{rp}$, Z is $$\sqrt{\dfrac{L_r}{C_{rp}}},$$

ω represents $$\dfrac{1}{\sqrt{L_r C_{rp}}},$$

$t_0$ represents an initial time point of a resonance state, $I_{Lr0}$ represents a value of an initial current flowing through $L_r$, and $V_0$ represents an output voltage.

Figure 8:
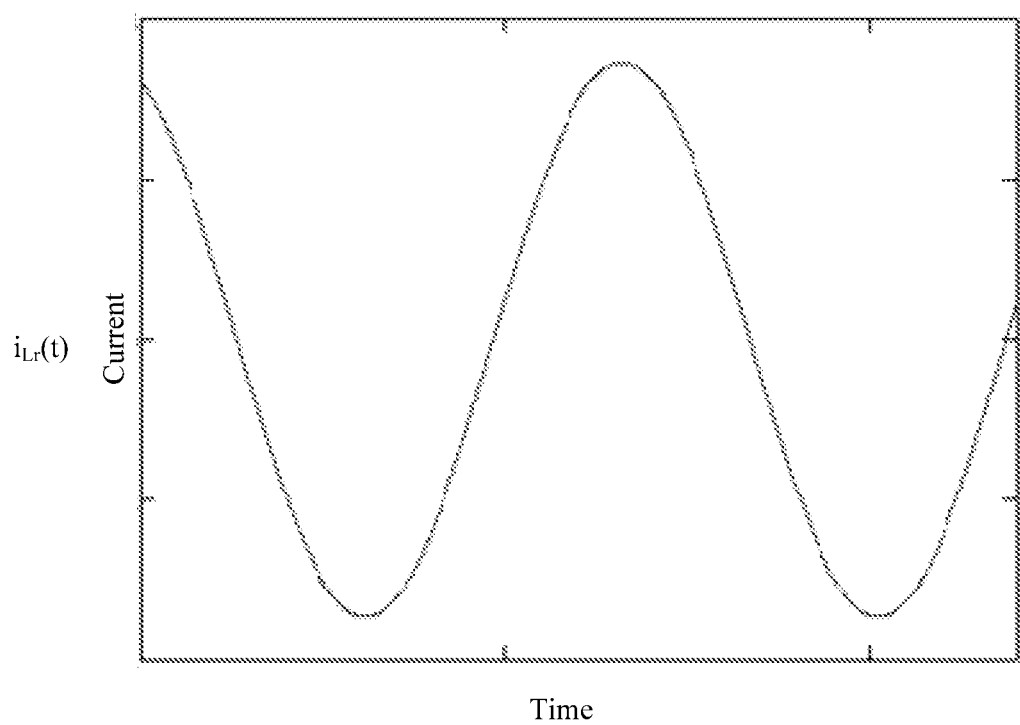
FIG. 8 is a schematic diagram of a change of only a primary-side current of a primary-side resonant capacitor according to an embodiment of this application.

A waveform of the primary-side current is used as an example. FIG. 8 is a schematic diagram of a change of only a primary-side current of a primary-side resonant capacitor according to an embodiment of this application. It can be seen from FIG. 8 that $i_{Lr}(t)$ represents a current of the primary-side winding, and $i_{Lr}(t)$ is a sinusoidal waveform oscillating around $i_{Lr}=0$.

When only the secondary-side resonant capacitor participates in resonance, the primary-side capacitor is considered as a constant voltage source, and a state equation of a resonant circuit is as follows:

$$\begin{cases} L_r \dfrac{di}{dt} + V_{Crs} = V_{Crp} = -\dfrac{N_P V_0}{N_S} \\ \dfrac{N_s^2}{N_P^2} C_{rs} \dfrac{dV_{Crs}}{dt} = i_{Lr} - \left( I_{Lm} - \dfrac{N_P V_0}{N_S L_m} t \right) + \dfrac{N_s I_0}{N_P} \end{cases}$$

In this case, the primary-side current $i_{Lr}$ is:

$$i_{Lr} = \left( \dfrac{N p V_0}{\omega N s L_m} + \dfrac{-\dfrac{N p V_0}{N s} + \dfrac{N p V_{Crs0}}{N s}}{Z} \right) \sin \omega(t - t_0) +$$

$$\left( I_{Lr0} - I_{Lm0} + \dfrac{N_s I_0}{N_P} \right) \cos \omega(t - t_0) + \left( I_{Lm0} - \dfrac{N_s I_0}{N_P} - \dfrac{N p V_0}{N s L_m}(t - t_0) \right)$$

$V_{Crs0}$ is an initial voltage value of $C_{rs}$, Z is $$\sqrt{\dfrac{L_r N_P^2}{C_{rs} N_S^2}},$$

ω represents $$\dfrac{1}{\sqrt{L_r C_{rs} \dfrac{N_S^2}{N_P^2}}},$$

$t_0$ represents an initial time point of a resonance state, $I_{Lr0}$ represents an initial current value of $L_r$, $V_0$ represents an output voltage, and $I_{Lm0}$ represents an initial current value of $L_m$.

Figure 9:
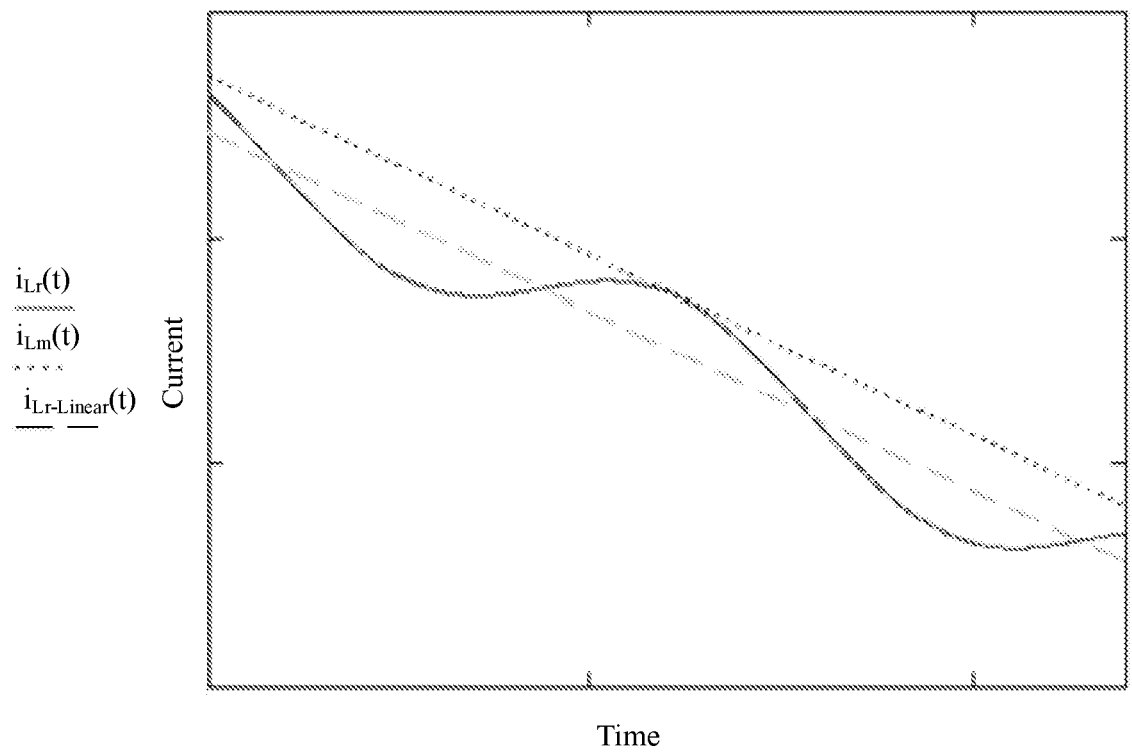
FIG. 9 is a schematic diagram of a change of only a primary-side current of a secondary-side resonant capacitor according to an embodiment of this application.

A waveform of the primary-side current is used as an example. FIG. 9 is a schematic diagram of a change of only a primary-side current of a secondary-side resonant capacitor according to an embodiment of this application. It can be seen from FIG. 9 that $i_{Lr}(t)$ represents the current of the primary-side winding, $i_{Lm}(t)$ represents the current of the excitation inductor, $$i_{Lm}(t) = I_{Lm0} - \dfrac{N p V_0}{N s L_m}(t - t_0),$$

and $$i_{Lr-Linear}(t) = i_{Lm}(t) - \dfrac{I_0 N_S}{N_P}.$$

$I_0$ represents an output current. $I_{Lr}(t)$ is a sinusoidal waveform oscillating around $i_{Lr-Linear}(t)$.

Figure 10:
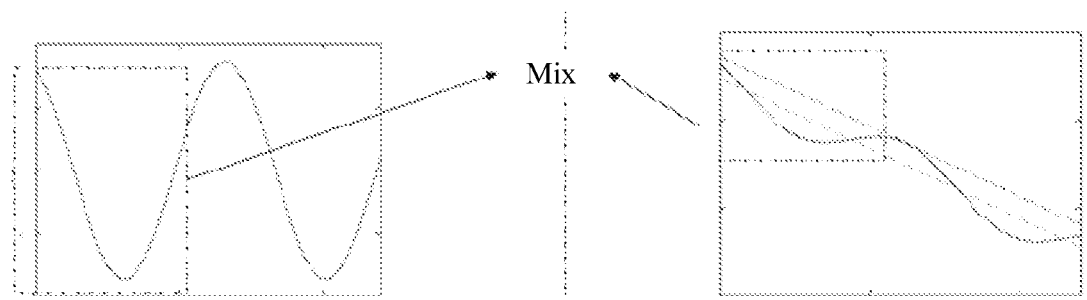
FIG. 10 is a schematic diagram of a change of a primary-side current of hybrid resonance formed by a primary-side resonant capacitor and a secondary-side resonant capacitor according to an embodiment of this application.

A waveform of the primary-side current of the hybrid resonance is equivalent to a mixture of a waveform of the primary-side current of the primary-side resonance and a waveform of the primary-side current of the secondary-side resonance. FIG. 10 is a schematic diagram of a change of a primary-side current of hybrid resonance formed by a primary-side resonant capacitor and a secondary-side resonant capacitor according to an embodiment of this application. A dashed-line box represents a time window, a size of the time window is (1–D)*T, and T represents a switching cycle of the asymmetrical half-bridge flyback converter. Within a time cycle of (1–D)*T, the waveform of the primary-side current of the hybrid resonance is equivalent to a waveform obtained after currents in a left dashed-line box and a right dashed-line box in FIG. 10 are mixed. It can be learned that the waveform of the current of the hybrid resonance may be more flexibly adjusted. In an adjustment process, the current of the hybrid resonance may be made to be closer to an average value as a whole, thereby reducing the root mean square value of the current flowing through the third power transistor.

It can be learned from the descriptions of the examples that in this embodiment of this application, the secondary-side resonant capacitor is used to implement the hybrid resonance, to effectively adjust an original resonance current waveform, reduce the root mean square value of the current of the secondary-side resonance, reduce the turn-on loss of the third power transistor, and improve the efficiency of the asymmetrical half-bridge flyback converter. In addition, in this embodiment of this application, the secondary-side resonant capacitor may reduce a ripple current flowing through an output electrolytic capacitor, reduce a loss of the electrolytic capacitor, and improve the efficiency of the asymmetrical half-bridge flyback converter.

Figure 11:
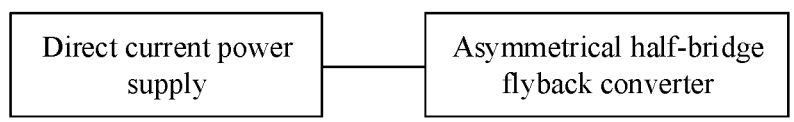
FIG. 11 is a schematic diagram of a component structure of a power supply system according to an embodiment of this application.

An embodiment of this application further provides a power supply system. As shown in FIG. 11, the power supply system includes a direct current power supply and the asymmetrical half-bridge flyback converter described in any one of FIG. 1 and FIG. 3 to FIG. 5.

An input terminal of the asymmetrical half-bridge flyback converter is coupled to the direct current power supply.

In some embodiments of this application, the power supply system further includes a load.

An output terminal of the asymmetrical half-bridge flyback converter is coupled to the load.

It can be learned from the descriptions of the examples in the foregoing embodiments of this application that the power supply system may include an asymmetrical half-bridge flyback converter. The asymmetrical half-bridge flyback converter includes: a first power transistor, a second power transistor, a primary-side resonant capacitor, a transformer, a third power transistor, and a secondary-side resonant capacitor, where the first power transistor and the second power transistor are coupled to two terminals of the direct current power supply after being connected in series; and the transformer includes an excitation inductor and a transformer leakage inductor, a primary side of the transformer is connected in parallel to two terminals of the first power transistor through the primary-side resonant capacitor, and a secondary side of the transformer is coupled to the third power transistor and the secondary-side resonant capacitor. Because the primary side of the transformer is coupled to the primary-side resonant capacitor, and the secondary side of the transformer is coupled to the secondary-side resonant capacitor, a waveform of a current flowing through the third power transistor can be adjusted through cooperation of the primary-side resonant capacitor and the secondary-side resonant capacitor, so that a root mean square value of the current flowing through the third power transistor is reduced, thereby reducing a turn-on loss of the third power transistor, improving efficiency of the asymmetrical half-bridge flyback converter, and improving efficiency of the power supply system.

An embodiment of this application further provides a power supply system. The power supply system includes a direct current power supply and the asymmetrical half-bridge converter described in any one of FIG. 1 and FIG. 2.

An input terminal of the asymmetrical half-bridge converter is coupled to the direct current power supply.

In some embodiments of this application, the power supply system further includes a load.

An output terminal of the asymmetrical half-bridge converter is coupled to the load.

It can be learned from the descriptions of the examples in the foregoing embodiments of this application that the power supply system may include an asymmetrical half-bridge converter. The asymmetrical half-bridge converter includes: a first power transistor, a second power transistor, a primary-side resonant capacitor, a transformer, a third power transistor, and a secondary-side resonant capacitor, where the first power transistor and the second power transistor are coupled to two terminals of the direct current power supply after being connected in series; and the transformer includes an excitation inductor and a transformer leakage inductor, a primary side of the transformer is connected in parallel to two terminals of the first power transistor through the primary-side resonant capacitor, and a secondary side of the transformer is coupled to the third power transistor and the secondary-side resonant capacitor. Because the primary side of the transformer is coupled to the primary-side resonant capacitor, and the secondary side of the transformer is coupled to the secondary-side resonant capacitor, a waveform of a current flowing through the third power transistor can be adjusted through cooperation of the primary-side resonant capacitor and the secondary-side resonant capacitor, so that a root mean square value of the current flowing through the third power transistor is reduced, thereby reducing a turn-on loss of the third power transistor, improving efficiency of the asymmetrical half-bridge converter, and improving efficiency of the power supply system.

An implementation type of a switching transistor is not specifically limited in this embodiment of this application, and the switching transistor is specifically a controllable switching transistor, for example, a metal-oxide-semiconductor field-effect transistor or an insulated gate bipolar transistor.

It should be noted that the terms "first" and "second" in the specification, the claims, and the accompanying drawings of this application are merely used for description purposes, and are not construed as indicating or implying relative importance. The terms "first" and "second" are used to distinguish between similar objects, and do not need to be used to describe a specific order or sequence. It should be understood that the terms used in such a way are interchangeable in proper circumstances, and this is merely a discrimination manner for describing objects having a same attribute in embodiments of this application. In addition, the terms "include", "contain" and any other variants mean to cover the non-exclusive inclusion, so that a process, method, system, product, or device that includes a series of units is not necessarily limited to those units, but may include other units not expressly listed or inherent to such a process, method, system, product, or device.

In this application, "at least one" means one or more, and "plurality" means two or more. The term "and/or" is used to describe an association relationship between associated objects, and represents that three relationships may exist. For example, "A and/or B" may represent the following three cases: Only A exists, only B exists, and both A and B exist, where A and B may be singular or plural. The character "/" usually represents an "or" relationship between the associated objects. "At least one of the following items (pieces)" or a similar expression thereof means any combination of the items, including any combination of one item (piece) or a plurality of items (pieces). For example, at least one (piece) of a, b, or c may represent a, b, c, "a and b", "a and c", "b and c", or "a, b, and c", where a, b, and c may be singular or plural.

All functional units in the embodiments of this application may be integrated into one processing unit, each unit may be separately used as one unit, or two or more units may be integrated into one unit. The integrated units may be implemented in a form of hardware, or may be implemented in a form of a hardware and software functional unit.

The foregoing descriptions are merely exemplary embodiments of this application, and are not intended to limit this application in any form. Although the preferred embodiments of this application are disclosed above, the embodiments are not intended to limit this application. By using the method and the technical content disclosed above, any person of ordinary skill in the art can make a plurality of possible changes and modifications on the technical solutions of this application, or amend the technical solutions thereof to be embodiments with equal effects through equivalent variations without departing from the protection scope of the technical solutions of this application. Therefore, any simple amendments, equivalent variations, and modifications made on the above embodiments according to the technical essence of this application without departing from the content of the technical solutions of this application shall fall within the protection scope of the technical solutions of this application.

The invention claimed is:

1. An asymmetrical half-bridge flyback converter, comprising a first power transistor, a second power transistor, a primary-side resonant capacitor, a transformer, a third power transistor, a secondary-side resonant capacitor and a filter;
the first power transistor and the second power transistor are coupled to two terminals of a direct current power supply after being connected in series; a primary side of the transformer is connected in parallel to two terminals of the first power transistor through the primary-side resonant capacitor, and a secondary side of the transformer is coupled to the third power transistor and the secondary-side resonant capacitor; and
the filter is connected in parallel to the secondary-side resonant capacitor, wherein the filter comprises a first inductor and a first capacitor;
the first inductor is configured to reduce ripples of the first capacitor; and
the secondary-side resonant capacitor is further configured to reduce the ripples of the first capacitor, to reduce a loss caused by an equivalent series resistance of the first capacitor.

2. The asymmetrical half-bridge flyback converter according to claim 1, wherein the transformer comprises an excitation inductor and a transformer leakage inductor; and
when the first power transistor is turned on, the primary-side resonant capacitor, the secondary-side resonant capacitor, and the transformer leakage inductor all participate in resonance, and the resonance is hybrid resonance.

3. The asymmetrical half-bridge flyback converter according to claim 1, wherein the transformer comprises an excitation inductor and a transformer leakage inductor; and
when the first power transistor is turned on, the secondary-side resonant capacitor and the transformer leakage inductor participate in resonance, the primary-side capacitor of the transformer does not participate in the resonance, the resonance is secondary-side resonance, and the primary-side capacitor is a capacitor coupled to the primary side of the transformer.

4. The asymmetrical half-bridge flyback converter according to claim 1, wherein the filter comprises a single-stage LC filter and a multi-stage LC filter.

5. The asymmetrical half-bridge flyback converter according to claim 2, wherein a parameter of the hybrid resonance is adjusted, to reduce a root mean square value of a current flowing through the third power transistor.

6. The asymmetrical half-bridge flyback converter according to claim 5, wherein the adjustment of the parameter of the hybrid resonance comprises at least one of the following:
adjusting the primary-side resonant capacitor, adjusting the secondary-side resonant capacitor, or adjusting a ratio of a capacitance value of the primary-side resonant capacitor to an equivalent capacitance value of the secondary-side resonant capacitor on the primary side; and the ratio of the capacitance value of the primary-side resonant capacitor to the equivalent capacitance value of the secondary-side resonant capacitor on the primary side is represented as ("C"_rp [N_p] ^2)/("C"_rs [N_s] ^2), wherein
C_rp represents the capacitance value of the primary-side resonant capacitor, ("C"_rs [N_s] ^2)/[N_p] ^2 represents the equivalent capacitance value of the secondary-side resonant capacitor on the primary side, C_rs represents a capacitance value of the secondary-side resonant capacitor, "Np" represents a quantity of turns of a primary-side winding of the transformer, and "Ns" represents a quantity of turns of a secondary-side winding of the transformer.

7. The asymmetrical half-bridge flyback converter according to claim 5, wherein the adjustment of the parameter of the hybrid resonance comprises: adjusting initial state values of the hybrid resonance;
the asymmetrical half-bridge flyback converter further comprises a second capacitor, and the second capacitor is connected in parallel to the third power transistor; and
the second capacitor is configured to adjust the initial state values of the hybrid resonance.

8. The asymmetrical half-bridge flyback converter according to claim 7, further comprising a first resistor;
wherein the first resistor and the second capacitor are connected in series; and
the first resistor is configured to reduce a current surge on the third power transistor and reduce current oscillation when the third power transistor is turned on.

9. The asymmetrical half-bridge flyback converter according to claim 3, wherein a parameter of the secondary-side resonance is adjusted, to reduce a root mean square value of a current flowing through the third power transistor.

10. The asymmetrical half-bridge flyback converter according to claim 9, wherein the adjustment of the parameter of the secondary-side resonance comprises: adjusting the secondary-side resonant capacitor.

11. The asymmetrical half-bridge flyback converter according to claim 9, wherein the adjustment of the parameter of the secondary-side resonance comprises: adjusting resonant element initial state values of the secondary-side resonance;
the asymmetrical half-bridge flyback converter further comprises a second capacitor, and the second capacitor is connected in parallel to the third power transistor; and
the second capacitor is configured to adjust the initial state values of the secondary-side resonance.

12. The asymmetrical half-bridge flyback converter according to claim 1, wherein the first power transistor is an upper transistor, and the second power transistor is a lower transistor; or
the first power transistor is a lower transistor, and the second power transistor is an upper transistor.

13. The asymmetrical half-bridge flyback converter according to claim 1, wherein the third power transistor comprises at least one of the following: a synchronous rectifier or a diode.

14. An asymmetrical half-bridge converter, comprising an asymmetrical half-bridge flyback converter or an asymmetrical half-bridge forward converter;
wherein the asymmetrical half-bridge flyback converter comprises a first power transistor, a second power transistor, a primary-side resonant capacitor, a transformer, a third power transistor, a secondary-side resonant capacitor and a filter;

the first power transistor and the second power transistor are coupled to two terminals of a direct current power supply after being connected in series; and a primary side of the transformer is connected in parallel to two terminals of the first power transistor through the primary-side resonant capacitor, and a secondary side of the transformer is coupled to the third power transistor and the secondary-side resonant capacitor; and the filter is connected in parallel to the secondary-side resonant capacitor, wherein the filter comprises a first inductor and a first capacitor;

the first inductor is configured to reduce ripples of the first capacitor; and the secondary-side resonant capacitor is further configured to reduce the ripples of the first capacitor, to reduce a loss caused by an equivalent series resistance of the first capacitor; or wherein a connection manner of dotted terminals of a transformer in the asymmetrical half-bridge forward converter is contrary to a connection manner of dotted terminals of the transformer in the asymmetrical half-bridge flyback converter; the asymmetrical half-bridge forward converter comprises a first transistor, a second transistor, a primary-side resonant capacitor, a transformer, a third power transistor, and a secondary-side resonant capacitor;

the first power transistor and the second power transistor are coupled to two terminals of a direct current power supply after being connected in series; and a primary side of the transformer is connected in parallel to two terminals of the first power transistor through the primary-side resonant capacitor, and a secondary side of the transformer is coupled to the third power transistor and the secondary-side resonant capacitor.

15. A power supply system, wherein the power supply system comprises a direct current power supply and an asymmetrical half-bridge converter, an input terminal of the asymmetrical half-bridge converter is coupled to the direct current power supply, wherein the asymmetrical half-bridge converter comprises an asymmetrical half-bridge flyback converter or an asymmetrical half-bridge forward converter;

wherein the asymmetrical half-bridge flyback converter comprises a first power transistor, a second power transistor, a primary-side resonant capacitor, a transformer, a third power transistor, a secondary-side resonant capacitor and a filter;

the first power transistor and the second power transistor are coupled to two terminals of a direct current power supply after being connected in series; and a primary side of the transformer is connected in parallel to two terminals of the first power transistor through the primary-side resonant capacitor, and a secondary side of the transformer is coupled to the third power transistor and the secondary-side resonant capacitor;

wherein a connection manner of dotted terminals of a transformer in the asymmetrical half-bridge forward converter is contrary to a connection manner of dotted terminals of the transformer in the asymmetrical half-bridge flyback converter; the asymmetrical half-bridge forward converter comprises a first transistor, a second transistor, a primary-side resonant capacitor, a transformer, a third power transistor, and a secondary-side resonant capacitor;

the first power transistor and the second power transistor are coupled to two terminals of a direct current power supply after being connected in series; and a primary side of the transformer is connected in parallel to two terminals of the first power transistor through the primary-side resonant capacitor, and a secondary side of the transformer is coupled to the third power transistor and the secondary-side resonant capacitor; and the filter is connected in parallel to the secondary-side resonant capacitor wherein the filter comprises a first inductor and a first capacitor;

the first inductor is configured to reduce ripples of the first capacitor; and the secondary-side resonant capacitor is further configured to reduce the ripples of the first capacitor, to reduce a loss caused by an equivalent series resistance of the first capacitor.

* * * * *

UNITED STATES PATENT AND TRADEMARK OFFICE
CERTIFICATE OF CORRECTION

PATENT NO. : 12,088,209 B2
APPLICATION NO. : 17/690840
DATED : September 10, 2024
INVENTOR(S) : Wang et al.

It is certified that error appears in the above-identified patent and that said Letters Patent is hereby corrected as shown below:

In the Claims

Claim 6: Column 28, Lines 4-5: "side is represented as ("C"_rp [N_p] ∧2)/("C"_rs[N_s] ∧2), wherein" should read as -- side is represented as ("C" _rp 〚N_p〛 ^2)/("C" _rs 〚N_s〛 ^2 ), wherein --.

Claim 6: Column 28, Line 7: "resonant capacitor, ("C"_rs [N_s] ∧2)/[N_p] ∧2 rep-" should read as -- resonant capacitor, ("C" _rs 〚N_s〛 ^2)/ 〚N_p〛 ^2 rep- --.

Signed and Sealed this
Tenth Day of June, 2025

Coke Morgan Stewart
*Acting Director of the United States Patent and Trademark Office*